(12) United States Patent
Wollenberg et al.

(10) Patent No.: US 11,919,060 B2
(45) Date of Patent: Mar. 5, 2024

(54) METHODS AND APPARATUS TO CONTROL ROLL-FORMING PROCESSES

(71) Applicant: The Bradbury Co., Inc., Moundridge, KS (US)

(72) Inventors: Jamie Wollenberg, Hesston, KS (US); Greg S. Smith, McPherson, KS (US)

(73) Assignee: The Bradbury Co., Inc., Moundridge, KS (US)

( * ) Notice: Subject to any disclaimer, the term of this patent is extended or adjusted under 35 U.S.C. 154(b) by 48 days.

(21) Appl. No.: 17/403,547

(22) Filed: Aug. 16, 2021

(65) Prior Publication Data

US 2023/0052057 A1 Feb. 16, 2023

(51) Int. Cl.
| B21B 37/16 | (2006.01) |
| B21D 5/00 | (2006.01) |
| G05B 13/02 | (2006.01) |
| G05B 13/04 | (2006.01) |

(52) U.S. Cl.
CPC .............. B21B 37/16 (2013.01); B21D 5/004 (2013.01); G05B 13/0265 (2013.01); G05B 13/042 (2013.01)

(58) Field of Classification Search
CPC ... B21D 7/08; B21D 7/12; B21D 7/14; B21D 5/004; B21D 5/08; B21B 37/16; B21B 38/04; B21B 2261/02; B21B 2261/04; G05B 13/0265; G05B 13/042
See application file for complete search history.

(56) References Cited

U.S. PATENT DOCUMENTS

| 3,180,122 A | 4/1965 | Evans et al. |
| 3,199,391 A | 8/1965 | Haner et al. |
| 3,416,340 A | 12/1968 | Reesor |
| RE26,996 E | 12/1970 | Beadle et al. |
| 3,566,639 A | 3/1971 | Dornbusch |
| 3,724,251 A | 4/1973 | Wegner |
| 3,756,050 A | 9/1973 | Kubo et al. |

(Continued)

FOREIGN PATENT DOCUMENTS

| AU | 2005200334 | 8/2010 |
| AU | 2010214719 | 3/2011 |

(Continued)

OTHER PUBLICATIONS

JP 61-119333A, Nakano Jun. 1986.*

(Continued)

*Primary Examiner* — Edward T Tolan
(74) *Attorney, Agent, or Firm* — HANLEY, FLIGHT & ZIMMERMAN, LLC

(57) ABSTRACT

Methods and apparatus to control roll-forming processes are disclosed. A disclosed example roll-forming apparatus includes an inlet portion to receive material, an outlet portion from which the material exits the roll-forming apparatus, a plurality of rollers extending between the inlet and outlet portions, a sensor to measure at least one dimension of the material as the material moves through the roll-forming apparatus, the material measured by the sensor between the inlet and outlet portions, and material adjuster circuitry to adjust roll-forming of the material by moving at least one of the plurality of rollers based on the at least one dimension.

22 Claims, 19 Drawing Sheets

(56) References Cited

U.S. PATENT DOCUMENTS

| | | | |
|---|---|---|---|
| 3,783,665 A | 1/1974 | Ashizawa | |
| 4,033,165 A | 7/1977 | Arimura et al. | |
| 4,117,702 A | 10/1978 | Foster | |
| 4,145,905 A | 3/1979 | Mattie | |
| 4,439,049 A | 3/1984 | Hoogendoorn et al. | |
| 4,454,738 A | 6/1984 | Buta | |
| 4,512,170 A | 4/1985 | Hsu | |
| 4,528,756 A | 7/1985 | Ichihara | |
| 4,558,577 A | 12/1985 | Trishevsky et al. | |
| 4,559,577 A | 12/1985 | Shoji et al. | |
| 4,635,458 A | 1/1987 | Bradlee | |
| 4,674,310 A | 6/1987 | Ginzburg | |
| 4,787,232 A | 11/1988 | Hayes | |
| 4,794,773 A | 1/1989 | Bradlee | |
| 4,872,330 A | 10/1989 | Nonini | |
| 4,878,368 A * | 11/1989 | Toutant | G05B 19/4163 72/181 |
| 4,910,985 A | 3/1990 | Ballyns | |
| 4,928,257 A | 5/1990 | Yerkes | |
| 5,010,756 A | 4/1991 | Nose et al. | |
| 5,060,498 A | 10/1991 | Seto et al. | |
| 5,193,066 A | 3/1993 | Konishi et al. | |
| 5,465,214 A | 11/1995 | Jeuniaux et al. | |
| 5,687,595 A | 11/1997 | Noe et al. | |
| 5,722,278 A | 3/1998 | Horino et al. | |
| 5,755,131 A | 5/1998 | Voth | |
| 5,829,286 A | 11/1998 | Noé et al. | |
| 5,953,946 A | 9/1999 | Mücke et al. | |
| 5,970,769 A * | 10/1999 | Lipari | B21D 5/02 72/181 |
| 6,029,485 A | 2/2000 | Böhmer | |
| 6,035,259 A | 3/2000 | Graff et al. | |
| 6,167,740 B1 | 1/2001 | Lipari et al. | |
| 6,282,932 B1 * | 9/2001 | Surina | B21D 5/08 72/247 |
| 6,345,524 B1 | 2/2002 | Fischer | |
| 6,434,994 B2 | 8/2002 | Bradbury et al. | |
| 6,477,879 B1 | 11/2002 | Sawa | |
| RE38,064 E | 4/2003 | Morello | |
| 6,766,278 B2 | 7/2004 | Liu et al. | |
| 6,769,279 B1 | 8/2004 | Bergman et al. | |
| 6,948,347 B2 | 9/2005 | Russo et al. | |
| 6,997,026 B2 * | 2/2006 | Fischer | B21D 47/00 72/181 |
| 7,111,481 B2 | 9/2006 | Green et al. | |
| 7,185,519 B2 | 3/2007 | Clark | |
| 7,461,529 B2 | 12/2008 | Clark | |
| 7,591,161 B2 | 9/2009 | Green et al. | |
| 8,117,879 B2 * | 2/2012 | Anderson | E04D 3/364 72/379.6 |
| 8,375,754 B2 | 2/2013 | Clark et al. | |
| 8,453,485 B2 * | 6/2013 | Smith | B21D 5/08 72/220 |
| 8,997,539 B2 | 4/2015 | Clark et al. | |
| 9,370,813 B2 | 6/2016 | Smith et al. | |
| 9,399,246 B2 | 7/2016 | Clark et al. | |
| 2005/0056067 A1 | 3/2005 | Clark | |
| 2005/0178181 A1 | 8/2005 | Green et al. | |
| 2006/0137418 A1 | 6/2006 | Clark | |
| 2006/0272376 A1 | 12/2006 | Green et al. | |
| 2007/0006625 A1 * | 1/2007 | Reinschke | B21B 37/28 72/11.7 |
| 2008/0060403 A1 * | 3/2008 | Felkl | B21B 37/58 72/205 |
| 2009/0120149 A1 | 5/2009 | Clark | |
| 2013/0133388 A1 | 5/2013 | Clark et al. | |
| 2013/0263636 A1 | 10/2013 | Smith et al. | |
| 2015/0183012 A1 | 7/2015 | Clark et al. | |
| 2017/0008054 A1 * | 1/2017 | Kubo | G06N 3/08 |
| 2019/0151924 A1 * | 5/2019 | Nillies | B21D 31/005 |
| 2023/0118015 A1 * | 4/2023 | Lindgren | B21B 38/02 72/9.1 |

FOREIGN PATENT DOCUMENTS

| | | | |
|---|---|---|---|
| CA | 2167014 | 8/2001 | |
| CA | 2481546 | 3/2005 | |
| CA | 2742173 | 3/2005 | |
| CA | 2497481 | 8/2005 | |
| CA | 2714126 | 2/2011 | |
| CN | 101850913 | 10/2010 | |
| DE | 10132105 | 8/2002 | |
| DE | 102007005614 | 8/2008 | |
| EP | 0865839 | 9/1998 | |
| EP | 1245302 | 10/2002 | |
| EP | 1514618 | 3/2005 | |
| EP | 1563922 | 8/2005 | |
| EP | 1889672 | 2/2008 | |
| EP | 1894643 | 3/2008 | |
| EP | 2289642 | 3/2011 | |
| EP | 2377628 | 10/2011 | |
| FR | 2766740 | 2/1999 | |
| JP | 63-13616 | 1/1988 | |
| WO | 97/04892 | 2/1997 | |
| WO | 2020/129173 A1 * | 6/2020 | G05B 13/02 |
| WO | 2020/166124 A1 * | 8/2020 | B21B 37/00 |

OTHER PUBLICATIONS

CN 111957749A, Wu et al. Nov. 2020.*
Translation FR 2766740A3, Cavillon et al. Feb. 1999.*
ASTM International, "Standard Specification for Steel, Sheet, Carbon, and High-Strength, Low-Alloy, Hot-Rolled and Cold-Rolled, General Requirements for," ASTM International, Designation: A 568/A 568M-03, May 2003, 5 pages.
Pennington, "CNC Slitter Replaces Packing with Programming," Modern Metals, Sep. 2004, 3 pages.
The Bradbury Company, Inc., "The Pressroom Leveler," published at Fabtech International, 1999, Chicago, IL, Nov. 14-18, 1999, 2 pages.
The Bradbury Company, Inc., "Corrective Roller Levelers for Superior Flatness," 1996, 6 pages.
The Bradbury Company, Inc., "Precision Straightener with Quick Change Roll Cassette System," [http://www.machineconcepts.com/PrecisionStraightener.asp] retrieved on Mar. 11, 2003, 2 pages.
Eiting et al., "Machine Concepts Letter," Feb. 11, 2003, 3 pages.
Bradbury, "Corrective Roller Leveling," 1997, 12 pages.
The Bradbury Company, Inc., "Leveling," 1997, 6 pages.
The Bradbury Company, Inc., "Introduces the Auto-Corrective Leveler," 1985, 12 pages.
The Bradbury Company, Inc., "Flat Trak," 2003, 2 pages.
Polytec, "ProSpeed laser sensors—Measure length and speed in production processes without contact," YouTube, Sep. 4, 2018, [https://www.youtube.com/watch?v=bR4stGTDHrw&t=43s] retrieved on Jan. 11, 2024, 7 pages.
Ametek Surface Vision, "Metals Surface Inspection Delivered Through Smart View: Online Detection, classification and visualization of surface defects," Ametek Surface Vision, [https://www.ameteksurfacevision.com/-/media/ameteksurfacevisionv2/documentation/industry-brochures/metals/ametek_surface_vision_metals_brochure_rev3_en.pdf?la=en&revision=04554206-7c4b-4486-9f1b-95c30f478552] retrieved on Jan. 11, 2024, 8 pages.

* cited by examiner

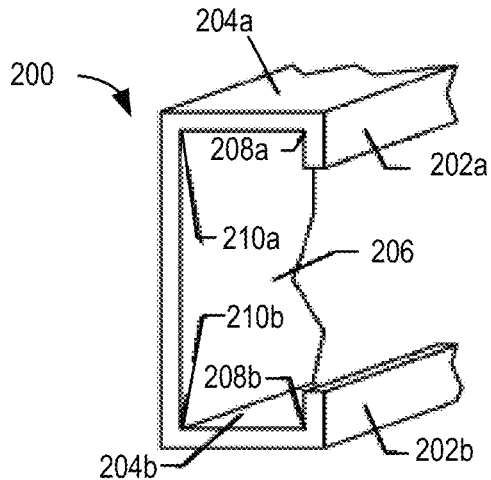
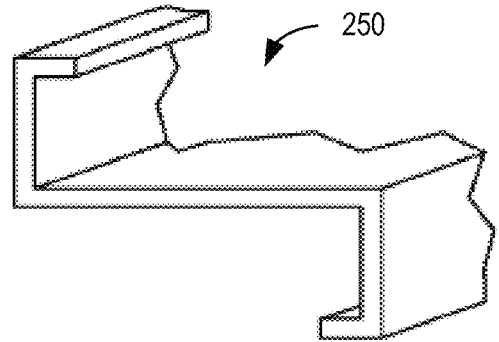
FIG. 2A  FIG. 2B
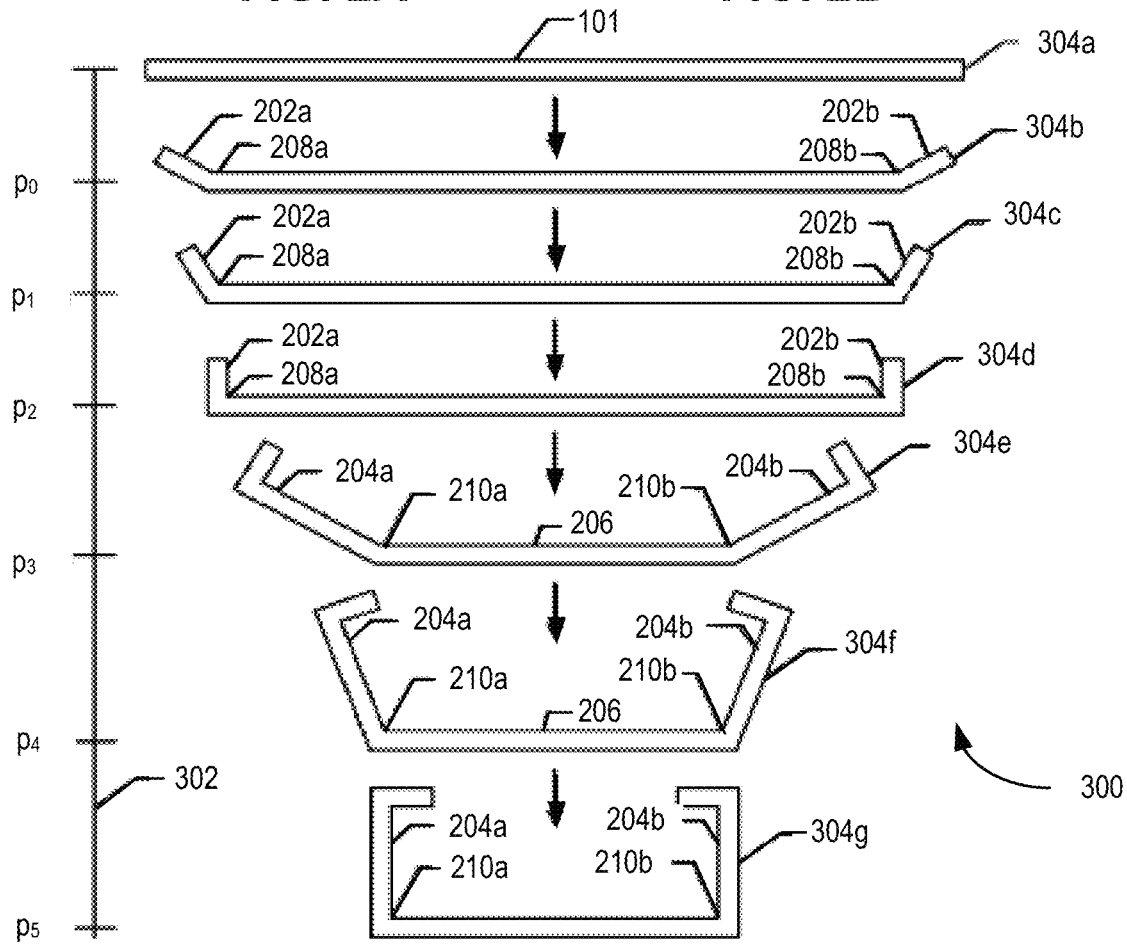
FIG. 3

METHODS AND APPARATUS TO CONTROL ROLL-FORMING PROCESSES

FIELD OF THE DISCLOSURE

This disclosure relates generally to roll-forming processes and, more particularly, to methods and apparatus to control roll-forming processes.

BACKGROUND

Roll-forming processes are typically used to manufacture formed components such as structural beams, siding, ductile structures, and/or any other components having a formed profile. A roll-forming process may be implemented using a roll-former machine or system having a sequenced plurality of forming passes. Each of the forming passes typically includes a roller assembly configured to contour, shape, bend, and/or fold a moving material. The number of forming passes required to form a component may be dictated by the characteristics of the material (e.g., the material strength) and the profile complexity of the formed component (e.g., the number of bends, folds, etc. needed to produce a finished component). The moving material may be, for example, a metallic strip material that is unwound from coiled strip stock and moved through the roll-former system. As the material moves through the roll-former system, each of the forming passes performs a bending and/or folding operation on the material to progressively shape the material to achieve a desired profile. For example, the profile of a C-shaped component has the appearance of the letter C when looking at one end of the C-shaped component.

A roll-forming process may be based on a post-cut process or a pre-cut process. A post-cut process involves unwinding a strip material from a coil and feeding the strip material through a roll-former system. In some cases, the strip material is first leveled, flattened, or otherwise conditioned prior to entering the roll-former system. A plurality of bending and/or folding operations is performed on the strip material as it moves through the forming passes to produce a formed material having a desired profile. The formed material is then removed from the last forming pass and moved through a cutting or shearing press that cuts the formed material into sections having a predetermined length. In a pre-cut process, the strip material is passed through a cutting or shearing press prior to entering the roll-former system. In this manner, pieces of formed material having a pre-determined length are individually processed by the roll-former system.

Formed materials or formed components are typically manufactured to comply with tolerance values associated with bend angles, lengths of material, distances from one bend to another, etc. In particular, bend angles that deviate from a desired angle are often associated with an amount of flare. In general, flare may be manifested in formed components as a structure that is bent inward or outward from a desired nominal position. A formed component may be flared-in, flared-out, or both such as, for example, flared-in at a leading end and flared-out at a trailing end. Flare-in is typically a result of overforming and flare-out is typically a result of underforming. Additionally or alternatively, flare may be a result of material characteristics such as, for example, a spring or yield strength characteristic of a material. For example, a material may spring out (i.e., tend to return to its shape prior to a forming operation) after it exits a roll-forming pass and/or a roll-former system.

BRIEF DESCRIPTION OF THE DRAWINGS

FIGS. 2A and 2B are isometric views of an example C-shaped component and a Z-shaped component, respectively, both of which can be produced by examples disclosed herein.

FIG. 3 is an example of a sequence of forming passes that may be used to produce the C-shaped component of FIG. 2A.

Figure 1:
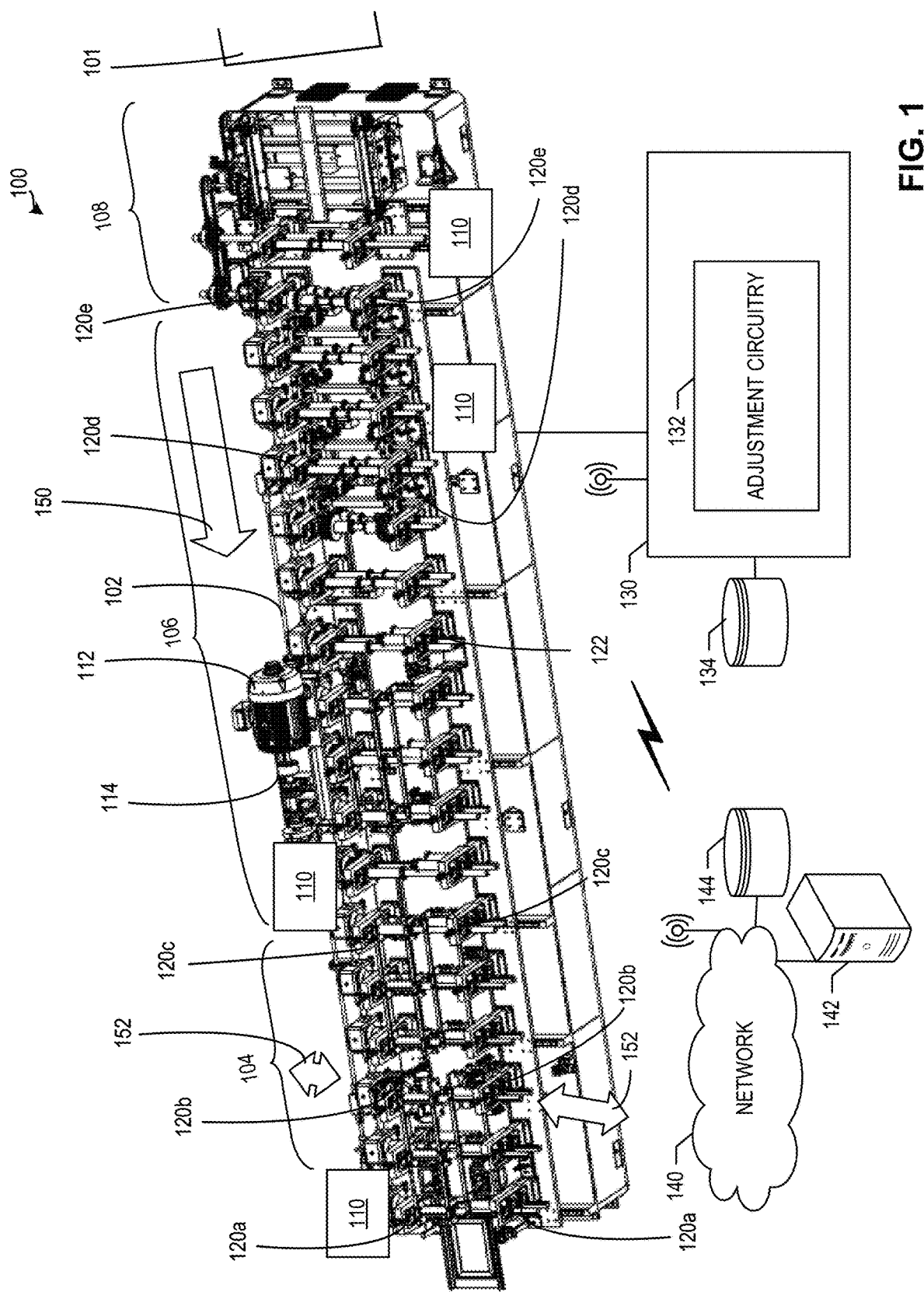
FIG. 1 is an example roll-forming apparatus in accordance with teachings of this disclosure.

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts. As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another. As used in this patent, stating that any part is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time+/−1 second. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Methods and apparatus to control roll-forming processes are disclosed. Processes of known roll-forming systems are adjusted by displacing rollers that move material (e.g., sheet metal, etc.). In particular, the rollers bend portions of the material as the material is moved via rotation of the rollers to define a cross-sectional profile having defined bent portions and associated walls. In known implementations, roll-forming is generally un-controlled and, as a result, can yield parts with flare and/or dimensions out of tolerance. In particular, known roll-forming processes are often adjusted manually based on operator experience. A known roll-forming implementation is shown in U.S. Pat. No. 7,111,481, granted on Mar. 6, 2007, and entitled "METHODS AND APPARATUS FOR CONTROLLING FLARE IN ROLL-FORMING PROCESSES," which is hereby incorporated by reference in its entirety.

Examples disclosed herein enable accurate automated control of roll-forming processes. Examples disclosed herein utilize automation to reduce a probability of operator error(s) and can, thus, enable accurately dimensioned roll-formed components, thereby reducing scrap as well as rejected parts. As a result, examples disclosed herein can significantly improve economic efficiencies and/or yields associated with roll-forming processes. Moreover, some examples disclosed herein can also utilize machine-learning methods and/or methodologies to further improve part yields. Examples disclosed herein can utilize historical data (e.g., data from other manufacturing sessions/part runs, data from other part runs, data associated with stock/lot identifiers, etc.) to improve accuracy of the roll-forming processes. Additionally or alternatively, data from different production sessions (e.g., of the same roll-forming machine) is utilized to train and/or develop the model.

Examples disclosed herein utilize a roll-forming apparatus with an inlet and outlet portion. A plurality of rollers extends between the inlet and outlet portions. A sensor is to measure at least one dimension of the material as the material moves through the roll-forming apparatus. In turn, a roll-former material adjuster adjusts roll-forming of the material by moving at least one of the plurality of rollers based on the at least one dimension. In some examples, the sensor is positioned downstream of the at least one of the rollers that is adjusted. Additionally or alternatively, the sensor is positioned at or proximate the outlet portion (e.g., at the outlet of the roll-forming apparatus).

In some examples, rollers designated and/or selected for adjustment can be rotated and translated to adjust the roll-forming of the material. Additionally or alternatively, the roll-forming is adjusted based on a determined flare of the material. In some examples, a 3D representation and/or a point cloud representation of the material is utilized for adjustment of the rollers. In some examples, multiple rollers are moved simultaneously to adjust the roll-forming process.

As briefly mentioned above, the adjustment of the roll-forming process can be based on a trained machine learning/AI model. In some such examples, the roll-forming apparatus can train the model for accurate adjustment of rollers in a subsequent implementation/inference phase. In particular, the model is trained based on measuring material at or proximate the inlet portion and also measuring the material at or proximate the outlet portion. Additionally or alternatively, the trained model can be downloaded via a network.

Some examples disclosed herein implement artificial intelligence (AI), including machine learning (ML), deep learning (DL), and/or other artificial machine-driven logic. Such example implementations enable machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

Many different types of machine learning models and/or machine learning architectures exist. In examples disclosed herein, a roll-forming material model is used. Using a roll-forming material model enables accurate control of roll-formed parts. In general, machine learning models/architectures that are suitable to use in the example approaches disclosed herein can be a Convolutional Neural Network (CNN)/Deep Neural Network (DNN) in which interconnections are not visible outside the model, or a network like a Graph Neural Network (GNN). However, other types of machine learning models could additionally or alternatively be used.

In general, implementing a ML/AI system involves two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labelling refers to an expected output of the machine learning model (e.g., a classification, an expected output value, etc.) Alternatively, unsupervised training (e.g., used in deep learning, a subset of machine learning, etc.) involves inferring patterns from inputs to select parameters for the ML/AI model (e.g., without the benefit of expected (e.g., labeled) outputs).

In examples disclosed herein, ML/AI models are trained using material with known or initially measured dimensions. However, any other training algorithm may additionally or alternatively be used. In examples disclosed herein, training is performed until desired parts are produced and/or a known relationship between input material and output parts is determined. In examples disclosed herein, training is performed at a training phase where material at an input of a roll-forming machine is characterized in relationship to material at the output of the roll-forming machine. Training is performed using hyperparameters that control how the learning is performed (e.g., a learning rate, a number of layers to be used in the machine learning model, etc.).

Training is performed using training data. In examples disclosed herein, the training data originates from locally available data, available data (e.g., available for download via a network), and/or generated data.

Once training is complete, the model is deployed for use as an executable construct that processes an input and provides an output based on the network of nodes and connections defined in the model. The model is stored at a data storage. The model may then be executed by a controller of a roll-forming machine/apparatus, for example.

Once trained, the deployed model may be operated in an inference phase to process data. In the inference phase, data to be analyzed (e.g., live data) is input to the model, and the model executes to create an output. This inference phase can be thought of as the AI "thinking" to generate the output based on what it learned from the training (e.g., by executing the model to apply the learned patterns and/or associations to the live data). In some examples, input data undergoes pre-processing before being used as an input to the machine learning model. Moreover, in some examples, the output data may undergo post-processing after it is generated by the AI model to transform the output into a useful result (e.g., a display of data, an instruction to be executed by a machine, etc.).

In some examples, output of the deployed model may be captured and provided as feedback. By analyzing the feedback, an accuracy of the deployed model can be determined. If the feedback indicates that the accuracy of the deployed model is less than a threshold or other criterion, training of an updated model can be triggered using the feedback and an updated training data set, hyperparameters, etc., to generate an updated, deployed model.

As used herein, the term "roller" refers to a device, component and/or assembly that includes at least a portion that rotates to move material. As used herein, the term "material" refers to material being formed and/or defined in a roll-forming apparatus. As used herein, the term "upstream" refers to a position or portion from which material being processed is moving away. Conversely, as used herein, the term "downstream" refers to a position or portion toward which the material is moving.

FIG. 1 illustrates an example roll-forming apparatus (e.g., a roll-forming machine, a roll-forming production machine, etc.) 100 in accordance with teachings of this disclosure. In the illustrated example material 101 is being moved through the roll-forming apparatus 100 and a cross-sectional profile thereof is being defined and/or altered as the material 101 passes through the roll-forming apparatus 100, as will be shown and described below in connection with FIGS. 2A-3. The example roll-forming apparatus 100 includes a body or frame 102 and is divided into an outlet or exit portion 104, an intermediate portion 106 and an inlet or entry portion 108. In this example, at least one sensor (e.g., means for measuring a dimension) 110 is mounted on and/or supported by the body 102. In the illustrated example, the body 102 supports a motor 112 that is operatively coupled to a drive train or transmission 114. The example drive train 114 drives rotation of rollers 120 (hereinafter rollers 120a, 120b, 120c, 120d, 120e, etc.) that are supported by brace supports 122 to align and/or position the respective rollers 120. In the illustrated example, the rollers 120 can be displaced and rotated based on commands from a controller 130.

According to the illustrated example of FIG. 1, the roll-forming apparatus 100 includes the controller 130 having adjustment circuitry 132 and communicatively coupled to a data storage 134. In some examples, the controller 130 is communicatively coupled (e.g., via a wired, wireless or cellular network) to a network 140 and, in turn, remote servers 142 and/or a data storage 144. The example shown in FIG. 1 is only an example and any appropriate control and/or network topology can be implemented instead.

To roll-form the material 101 by bending portions thereof at different roller stages of the roll-forming apparatus 100, the material 101 is provided to the inlet portion 108 where it is aligned and/or positioned (e.g., centered) relative to the rollers 120. As the material 101 is fed/provided to the roll-forming apparatus 100, the material 101 is moved by rotation of the rollers 120 along a direction generally indicated by an arrow 150 and, additionally, at least one of the rollers 120 is moved during rotation thereof to bend at least a portion of the material 101 as the material 101 is moved through the roll-forming apparatus 100. In particular, the example rollers 120 are positioned and oriented to form and/or bend the material 101 as it passes through multiples ones of the rollers 120. In particular, ones of the movable rollers 120 are pivoted and translated to bend a cross-sectional profile of the material 101 with incremental bends. In some examples, the rollers 120 are moved between different material passes. In this example, both an orientation and position of each of the rollers 120 can be controlled by moving the respective rollers 120. However, other roller implementations can be implemented instead (e.g., rollers that rotate and pivot in multiple different degrees of freedom). The example rollers 120 can be moved via motors, actuators, solenoids, etc. or even manually (e.g., based on calculations provided to an operator from the controller 130) to pivot and translate relative to the material 101.

To control roll-forming parameters of the material 101 as the material 101 is moved by rotation of the rollers 120, at least one of the sensors 110 measures at least one dimension of the material 101. In this example, the controller 130 determines an adjustment of at least one of the rollers 120 so that the material 101 exiting the roll-forming apparatus is within desired dimensional control parameters. In this example, the controller 130 of the illustrated example causes the at least one of the rollers 120 to pivot and/or translate based on the determined adjustment during the roll-forming process, thereby enabling accurate control of the material 101 as it is being roll-formed. In this example, the sensors 110 used for adjustment of the roll-forming process are downstream of the rollers 120 that are adjusted to control the roll-forming process. In some examples, the rollers 120 of the illustrated example are adjusted based on measuring a portion of the material 101 at or near the exit portion 104 (e.g., just beyond the exit portion 104). In some examples, adjustments of multiple ones of the rollers 120 are performed based on the at least one dimension (e.g., the multiples ones of the rollers 120 are adjusted simultaneously). In some examples, the rollers 120 can also be moved along a direction generally indicated by an arrow 152, for example. In some such examples, the rollers 120 can be moved in the directions indicated by the arrow 152 via an acme screw, a solenoid, a motor, and/or an actuator, etc.

In some examples, the controller 130 determines and/or generates a point cloud (e.g., a point cloud model, a point cloud data representation, etc.) of the material 101 based on sensor data from the sensors 110 and, accordingly, the point cloud can be used in determining the aforementioned adjustment of the at least one of the rollers 120. Additionally or alternatively, the controller 130 generates and/or determines a 3-D model of the material 101 based on the sensor data such that the 3-D model can be used to adjust the rollers 120. In some examples, the at least one dimension includes at least one linear dimension and at least one angular dimension (e.g., a bend angle, an angle between two surfaces) of the material 101.

In some examples, the adjustment of the roll-forming process of the material 101 is determined and/or calculated by the servers 142 (e.g., substantially in real time). In other words, the roll-forming process may be controlled from a remote location in some examples. In some such examples, sensor data from the sensors 110 and/or data associated with the sensors 110 is transmitted and/or forwarded to the servers 142 via the network 140. In some examples, trained models (e.g., trained machine learning models) are transferred between the servers 142 and the controller 130. In examples in which models are trained at the servers 142, the models can be trained with multiple roll-forming machines (e.g., at different sites, etc.) and subsequently provided to the controller 130 for implementation in roll-forming production.

In this example, the sensors 110 are implemented as laser sensors in a closed-loop control scheme directed by the controller 130. However, any appropriate sensor implementation and/or control scheme can be implemented instead. For example, the sensors 110 can be implemented as, but not limited to, cameras, visual sensors, sonar sensors, ultrasonic sensors, sound-based sensors, positional sensors, mechanical sensors, mechanical gages, temperature sensors, infrared sensors, etc. In some examples, only a single set of the sensors 110 (e.g., a pair of the sensors 110) is implemented and positioned downstream of the adjustable rollers 120.

As mentioned above, in some examples, machine learning and/or AI techniques is employed. In some such examples, the roll-forming apparatus 100 can implement a trained model associated with material processed by the roll-forming apparatus 100 or any other roll-forming or similar machinery. In some such examples, the roll-forming apparatus 100 trains and/or develops the training model, as well as implements the training model in an inference/implementation phase for roll-forming the material 101 with a relatively high degree of accuracy. In some examples, the controller 130 and/or the roll-forming apparatus receives a trained or partially trained model via the network 140. In some examples, the controller 130 further trains and/or develops the model received from the network 140.

In this example, the roll-forming apparatus 100 works to adjust and/or adapt the roll-forming process based on sensor output and/or sensor output data from the sensors 110 as the material is moved through the roll-forming apparatus 100. However, in some other examples, the roll-forming apparatus 100 is implemented to indicate adjustments to an operator (e.g., for subsequent manual adjustment by the operator). Additionally or alternatively, the roll-forming apparatus 100 is implemented as a go/no-go system in which the material 101 is measured by the sensor 110 and the material 101 is stopped from being roll-formed, moving through the roll-forming process and/or further processing (e.g., post-processing such as cutting) if the at least one dimension measured by the sensor 110 does not conform to tolerances and/or a desired dimensional profile (e.g., a desired 3-D profile of the material 101).

FIGS. 2A and 2B are isometric views of cross-sectional profiles of an example C-shaped component 200 and example Z-shaped component 250, respectively, both of which can be produced by examples disclosed herein. The example C-shaped component 200 and the example Z-shaped component 250 may be formed by roll-forming the material 101 with the example roll-forming apparatus 100 of FIG. 1. However, the example roll-forming apparatus 100 is not limited to forming the example components 200 and 250 and/or similar structures. In fact, the example roll-forming apparatus 100 can produce vastly different cross-sectional profiles, such as garage door frames, for example. As shown in FIG. 2A, the C-shaped component 200 includes two return structures 202a and 202b, two flange structures 204a and 204b, and a web structure 206 disposed between the flange structures 204a and 204b. As described below in connection with FIG. 3, the return structures 202a-b, the flange structures 204a-b, and the web structure 206 may be formed by folding the material 101 at a plurality of folding lines 208a, 208b, 210a, and 210b.

FIG. 3 is an example of a sequence of forming passes 300 that may be used to produce the example C-shaped component 200 of FIG. 2A. The example forming pass sequence 300 is illustrated using the material 101 of FIG. 1 and a forming pass sequence line 302 that shows a plurality of forming passes $p_0$-$p_5$ associated with folds or bends that create a corresponding one of a plurality of component profiles 304a-g. As described below in connection with FIGS. 3-16, defining of the folds or bends associated with the passes $p_0$-$p_5$ are applied along the plurality of folding lines 208a-b and 210a-b (FIG. 2A) to create the return structures 202a-b, the flange structures 204a-b, and the web structure 206 shown in FIG. 2A can be controlled for improved control of produced parts, as well as control of flare in roll-forming processes.

As depicted in FIG. 3, the material 101 shown in FIG. 1 has an initial component profile 304a, which corresponds to an initial state on the forming pass sequence line 302. The return structures 202a-b are formed in passes $p_0$ through $p_2$. The pass $p_0$ is associated with a component profile 304b. The pass $p_0$ may be configured to perform a folding operation along folding lines 208a-b to start the formation of the return structures 202a and 202b. The material 101 is then moved through the pass $p_1$. The pass $p_1$ performs a further folding or bending operation along the folding lines 208a and 208b to form a component profile 304c, after which the pass $p_2$ receives the material 101. The pass $p_2$ may be configured to perform a final folding or bending operation at the folding lines 208a and 208b to complete the formation of the return structures 202a and 202b as shown in a component profile 304d.

The flange structures 204a and 204b are then formed in passes $p_3$ through $p_5$. The pass $p_3$ may be configured to perform a folding or bending operation along folding lines 210a and 210b to form a component profile 304e. The pass $p_4$ may then perform a further folding or bending operation along the folding lines 210a-b to form a component profile 304f. The component profile 304f may have a substantially reduced width that may require the pass $p_4$ to be implemented using staggered forming units. In a similar manner, a pass $p_5$ may be configured to perform a final folding or bending operation along the folding lines 210a and 210b to complete the formation of the flanges 204a-b to match a component profile 304g. The component profile 304g may be substantially similar or identical to the profile of the example C-shaped component 200 of FIG. 2A. Although the C-shaped component 200 is shown as being formed by the six passes $p_0$-$p_5$, any other number of passes may be used instead.

Figure 4A:
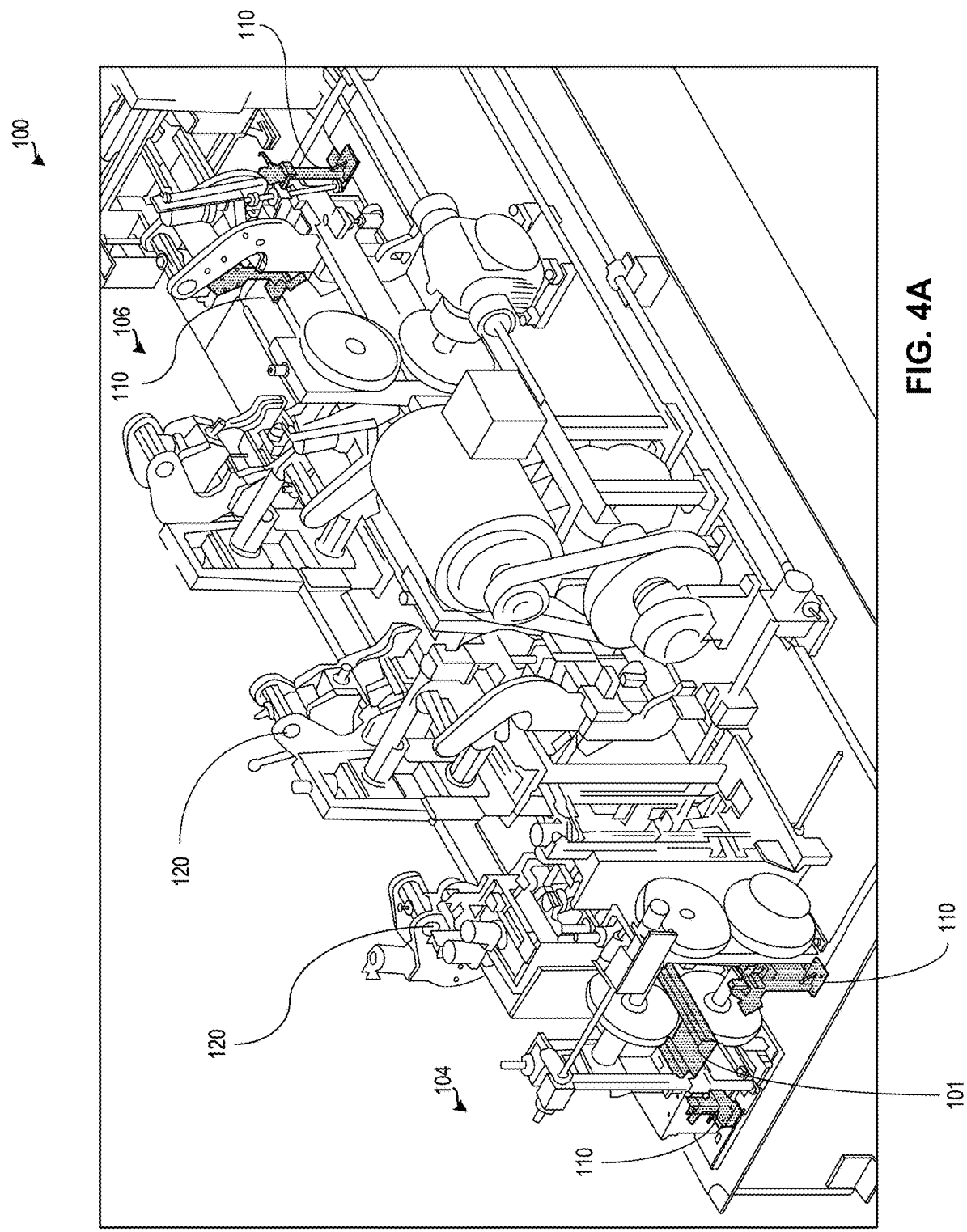
FIGS. 4A-4D depict portions of the example roll-forming apparatus of FIG. 1.

FIGS. 4A-4D depict portions of the roll-forming apparatus 100. Turning to FIG. 4A, the sensors 110 are shown near and/or at the exit portion 104 of the roll-forming apparatus 100. In this example, the sensors 110 are positioned downstream of all of the rollers 120. On other words, the adjusting rollers 120 are positioned upstream of the sensors 110 from which sensor data is used to determine an adjustment of the rollers 120 (e.g., to mitigate and/or reduce flare of the material 101). Additionally or alternatively, the sensors 110 at the intermediate portion 106 can be used to measure the material 101 so that at least one of the rollers 120 can be adjusted to control dimensions (e.g., height, depth, angles, etc.) of the material 101 that exits the roll-forming apparatus 100. In some examples, the sensors 110 at the outlet portion 104 are used to measure the material 101 for subsequent roll-forming with material of later production runs (e.g., the material 101 training the model for the subsequent roll-forming is scrapped).

Figure 4C:
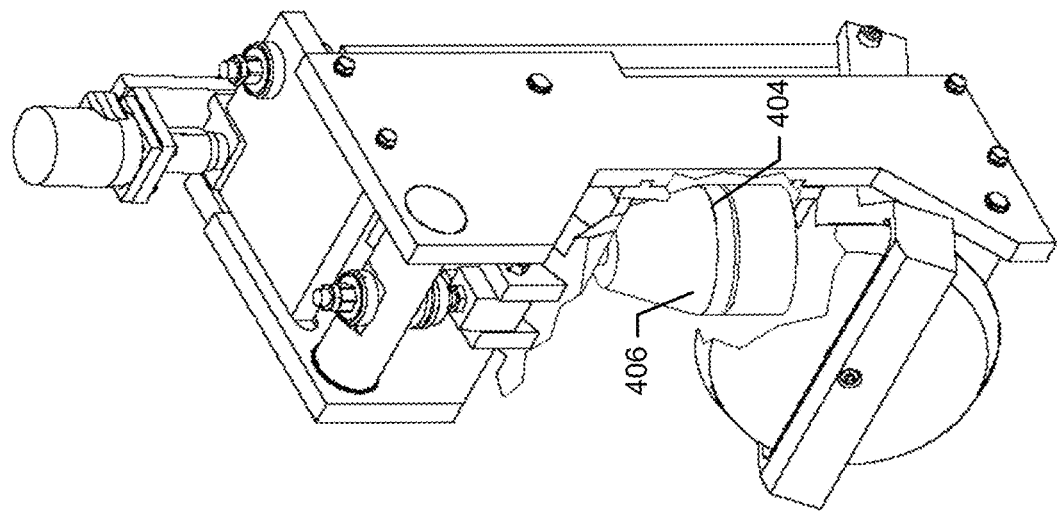
Figure 4B:
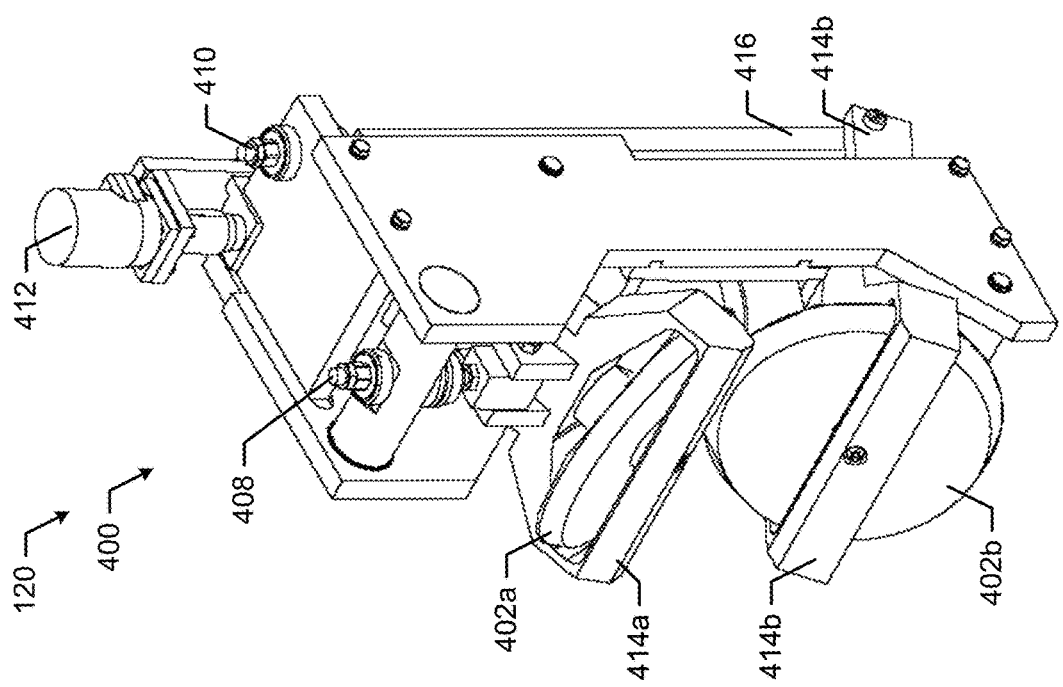

FIGS. 4B and 4C are isometric views of an example forming unit 400, which can implement the example roller 120 shown in FIG. 1. The example forming unit 400 or other forming units substantially similar or identical to the example forming unit 400 may be used to implement the forming passes as mentioned above in connection with FIG. 3. The example forming unit 400 is shown by way of example as having an upper side roller 402 a, a lower side roller 402 b, and a return or flange roller 404 (i.e., a flange roller 404) (shown in FIG. 4C).

Any material capable of withstanding the forces associated with the bending or folding of a material such as, for example, steel, may be used to implement the rollers 402 a-b and 404. The rollers 402 a-b and 404 may also be implemented using any shape suitable for performing a desired bending or folding operation. For example, the angle of a forming surface 406 of the flange roller 404 may be configured to form a desired structure (e.g., the return structures 202 a-b and/or the flange structures 204 a-b) having any desired angle.

The positions of the rollers 402 a-b and 404 may be adjusted to accommodate, for example, different thickness materials. More specifically, the position of the upper side roller 402 a may be adjusted by a position adjustment system 408, the position of the lower side roller 402 b may be adjusted by a position adjustment system 410, and the position of the flange roller 404 may by adjusted by a position adjustment system 412. As shown in FIG. 4B, the position adjustment system 408 is mechanically coupled to an upper side roller support frame 414 a. As the position adjustment system 408 is adjusted, the upper side roller support frame 414 a causes the upper side roller 402 a to move along a curved path toward or away from the flange roller 404. In a similar manner, the position adjustment system 410 is mechanically coupled to a lower side roller support frame 414 b via an extension element 416 (e.g., a push rod, a link arm, etc.). As shown clearly in FIG. 4B, adjustment of the position adjustment system 410 moves the extension element 416 to cause the lower side roller support frame 414 b to swing the lower side roller 402 b toward or away from the flange roller 404. The angle adjustment of the flange roller 404 with respect to the position adjustment system 410 is described below in connection with FIG. 4D.

Figure 4D:
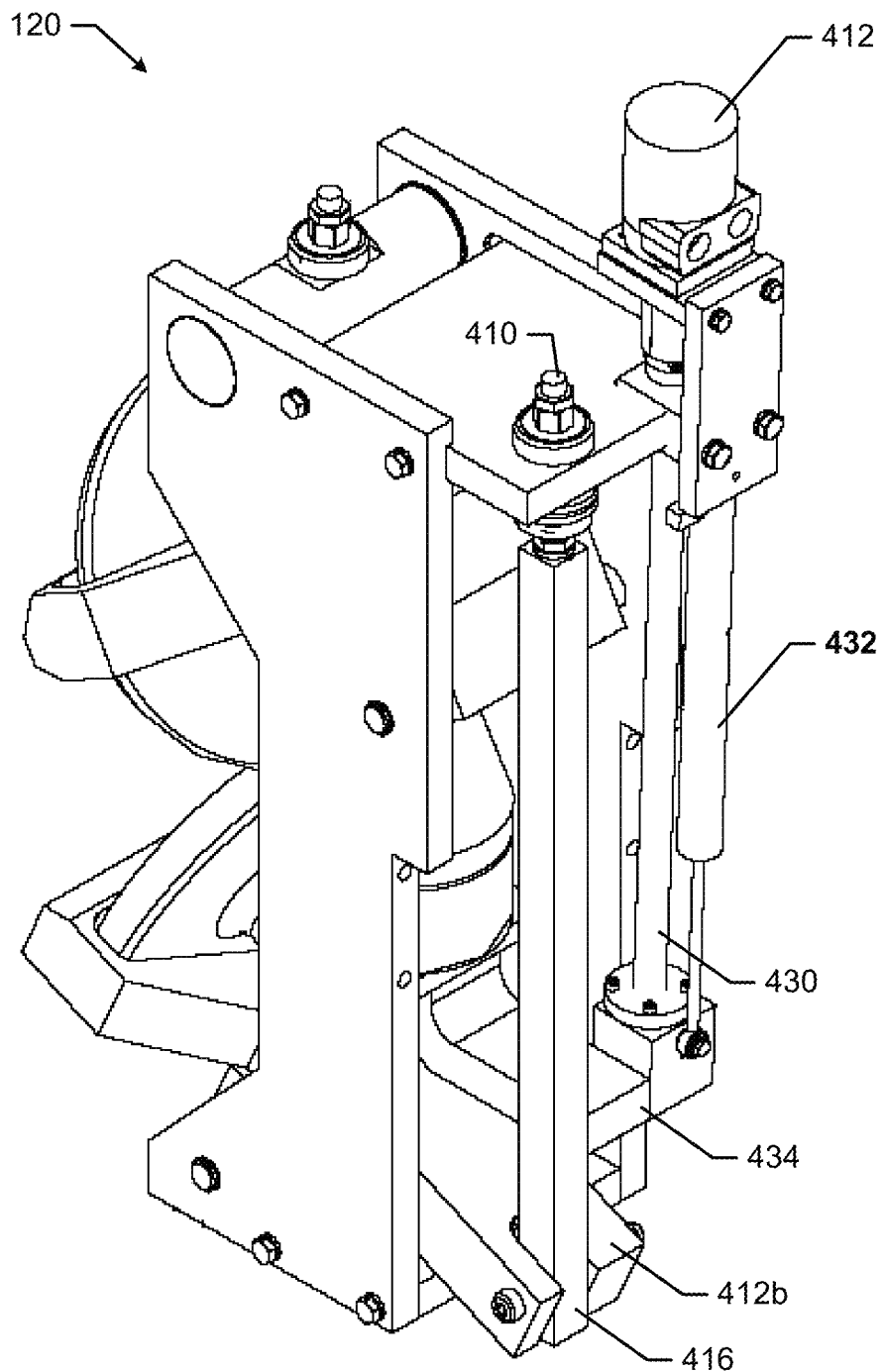

FIG. 4D is another isometric view of the example forming unit 400 of FIGS. 4B and 4C. In particular, the position adjustment systems 410 and 412, the extension element 416, and the lower side roller support frame 414b of FIG. 4B are shown in FIG. 4D. The position adjustment system 412 may be mechanically coupled to an extension element 430 and a linear encoder 432. Additionally, the extension element 430 and the linear encoder 432 may also be mechanically coupled to a roller support frame 434 as shown. In some examples, the position adjustment system 412, the extension element 430, and the linear encoder 432 may be used to adjust and/or measure the position or angle of the flange roller 404.

In general, the position adjustment system 412 may be utilized in a manufacturing environment to achieve a specified flare tolerance value. Flare is generally associated with the flanges of a formed component such as, for example, the example C-shaped component 200 of FIG. 2A and the example Z-shaped component 250 of FIG. 2B.

The position adjustment system 412 may be implemented using any actuation device capable of actuating the extension element 430. For example, the position adjustment system 412 may be implemented using a servo motor, a stepper motor, a hydraulic motor, hydraulic devices, a nut, a hand crank, a pneumatic piston, an acme screw, etc. Additionally, the position adjustment system 412 may be mechanically coupled or integrally formed with a threaded rod that screws or threads into the extension element 430. In this manner, as the position adjustment system 412 is operated (e.g., turned or rotated), the threaded rod causes the extension element 430 to extend or retract to move the roller support frame 434 to vary the angle of the flange roller 404.

The linear encoder 432 may be used to measure the distance through which the position adjustment system 412 displaces the roller support frame 434. Additionally or alternatively, the information received from the linear encoder 432 may be used to determine the angle and/or position of the flange roller 404. In any case, any device capable of measuring a distance associated with the movement of the roller support frame 434 may be used to implement the linear encoder 432.

Figure 9:
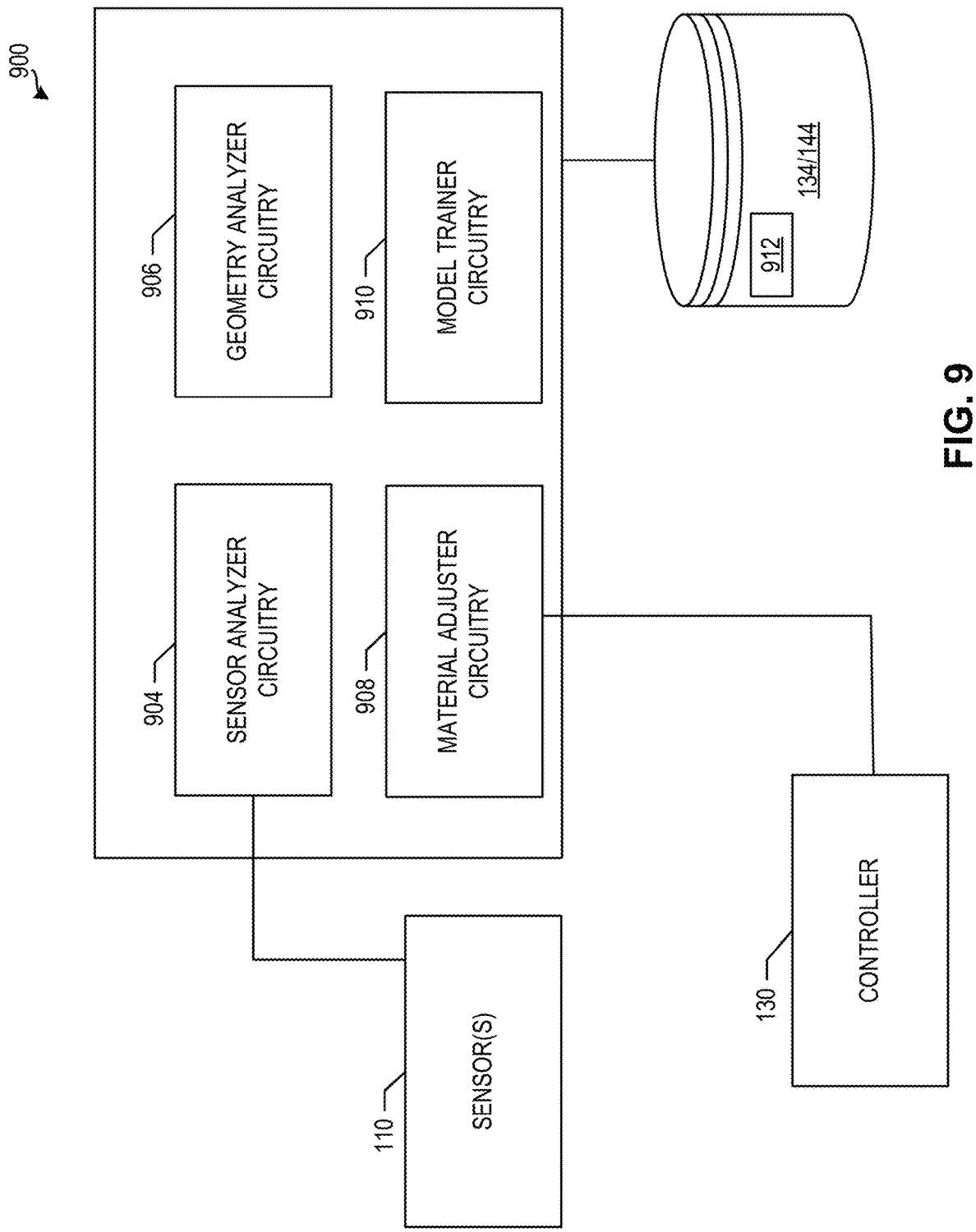
FIG. 9 is a schematic overview of an example roll-forming analysis system that can be implemented in examples disclosed herein.

The linear encoder 432 may be communicatively coupled to the controller 130 of FIG. 1 and/or an example roll-forming analysis system 900 shown in FIG. 9, for example. In particular, data pertaining to sensor output of the sensor(s) 110 may be utilized by the controller 130 of FIG. 1 and/or the example roll-forming analysis system 900 to automatically direct movement of the rollers 402a, 402b via movement and/or control of the position adjustment system 412.

The position and/or angle of the flange roller 404 may be configured by hand (e.g., manually) or in an automated manner. For example, if the position adjustment system 412 includes a hand crank, an operator may turn or crank the position adjustment system 412 until the target setting(s) acquired by the linear encoder 432 matches or is substantially equal to the measurement retrieved from the storage 134/144.

Although, the position adjustment system 412 and the linear encoder 432 are shown as separate units, they may be integrated into a single unit. For example, a servo motor used to implement the position adjustment system 412 may be integrated with a radial encoder that measures the number of revolutions performed by the position adjustment system 412 to displace the roller support frame 434. Alternatively, the linear encoder 432 may be integrated with a linear actuation device such as a pneumatic piston. In this manner, the linear encoder 432 may acquire a distance or displacement measurement as the pneumatic piston extends to displace the roller support frame 434.

Figure 5:
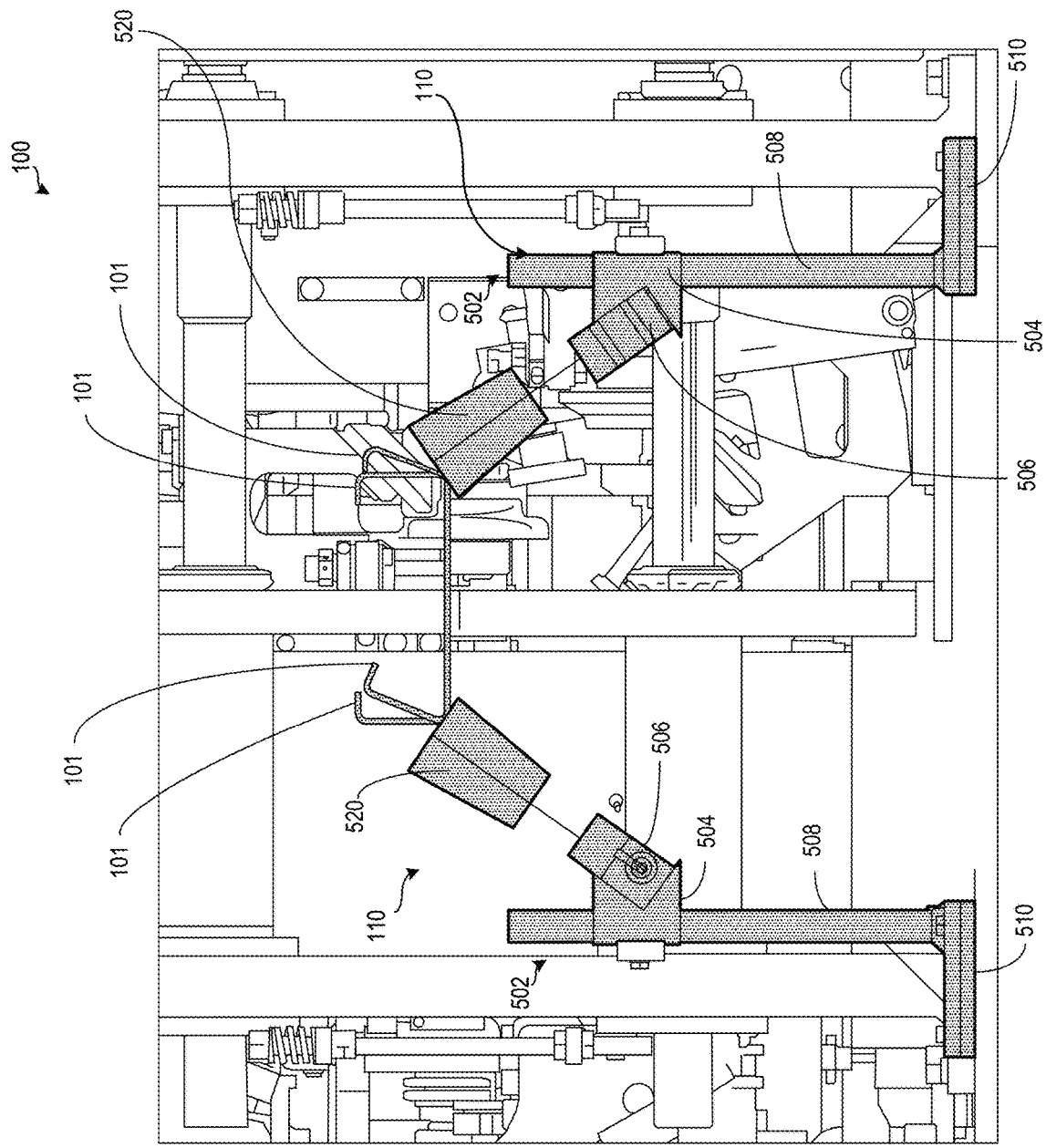
FIG. 5 is a frontal view of a portion of the example roll-forming apparatus of FIGS. 1 and 4A-4D.

Turning to FIG. 5, a frontal view of a portion of the example roll-forming apparatus 100 is shown. In particular, the view of FIG. 5 is shown from a direction of travel of the material 101 with multiple different geometries of the material 101 shown simultaneously for clarity. In this example, the sensors 110 are shown along laterally opposed positions (left and right of the material 101 in the view of FIG. 5). According to the illustrated example, the sensor 110 includes a sensor assembly 502 which, in turn, includes a sensor mount 504 with a corresponding pivot 506, a post (e.g., a mast, a height adjuster post, a vertical support, etc.) 508 and a base (e.g., a support base, movable support base, etc.) 510.

In the illustrated example, the sensors 110 are positioned to measure at least one dimension of the material 101 as the material 101 is moved through the roll-forming apparatus 100. In turn, the at least one dimension is utilized to control and/or direct movement of at least one of the rollers 120 of FIG. 1 to control roll-forming of the material 101. As a result, dimensions of parts produced on the roll-forming apparatus 100 can be tightly controlled and, additionally, flare of the material 101 can be reduced (e.g., eliminated). Accordingly, detecting parameters and/or dimensions of the material 101 can greatly improve accuracy of the roll-forming process. In this example, both linear and angular measurements of the material 101 are measured for control of the roll-forming process of the material 101.

To enable favorable placement of the sensors 110 relative to the material 101 as the material 101 is roll-formed, the sensor mount 504 can move along a longitudinal length of the post 508. Further, the sensor 110 and/or the sensor mount 504 can be rotated about the pivot 506 to orient the sensor 110 to accurately measure the at least one dimension of the material 101 and also enable a wide degree of adjustability for different sized parts. As can be seen in FIG. 5, zones 520 represent sensing regions of the sensors 110 corresponding to the material 101.

Figure 6:
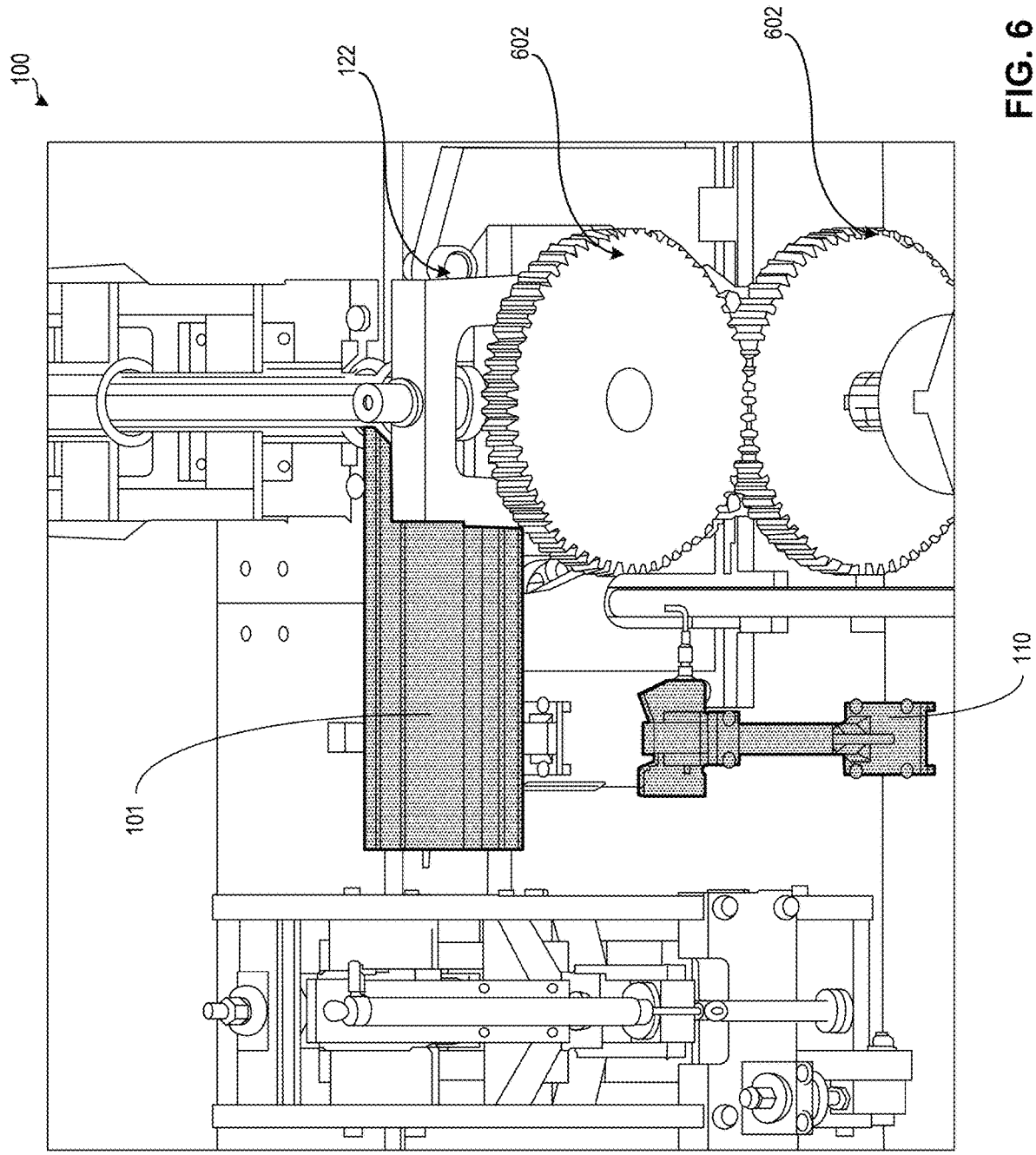
FIG. 6 is a detailed view of a portion of the example roll-forming apparatus of FIGS. 1, 4A-4D and 5.

FIG. 6 is a detailed view of a portion of the example roll-forming apparatus 100. In the illustrated example of FIG. 6, the intermediate portion 106 of the roll-forming apparatus 100 through which the material 101 passes through the roll-forming apparatus 100 is shown. In the view of FIG. 6, the material 101 is an area of the roll-forming apparatus 100 that can be measured prior to subsequent roll-forming passes (e.g., of the exit portion 104). In this example, one of the brace supports 122 is shown supporting gears 602. The gears 602 of the illustrated example are implemented to move the material 101 subsequent to the rollers 120 roll-forming the material 101. In the illustrated example of FIG. 6, at least one of the sensors 110 (e.g., opposing ones of the sensors 110) measures the material 101 as the material 101 is moving through the roll-forming apparatus 100 for controlling the roll-forming process. In other words, some examples disclosed herein can utilize measurements of the material 101 moving through the roll-forming apparatus 100 to control the roll-forming process.

Figure 7:
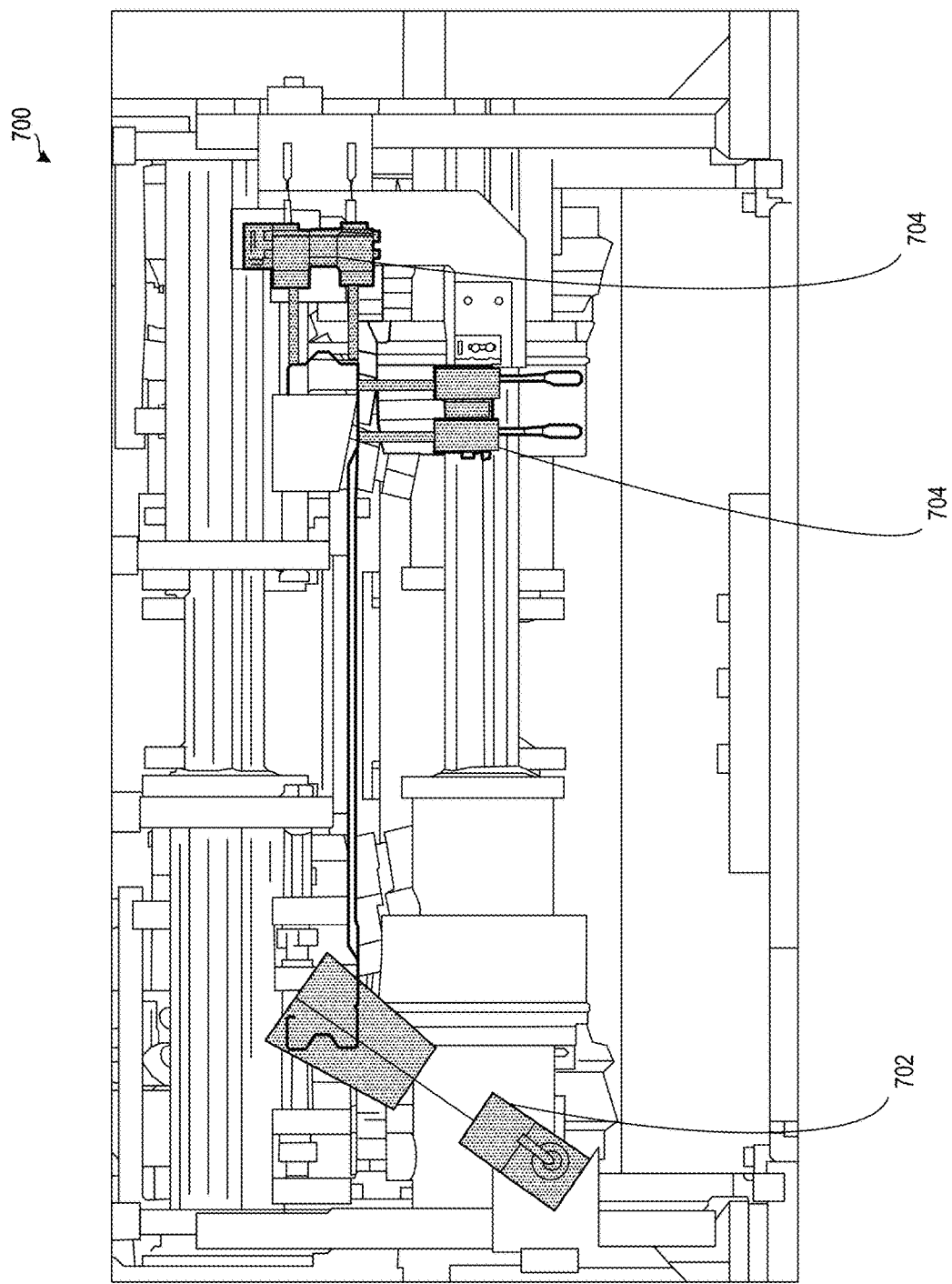
FIG. 7 is a frontal view of another example roll-forming apparatus.

FIG. 7 is a frontal view of another example roll-forming apparatus 700. The illustrated view of FIG. 7 depicts an alternative example sensor implementation that can be implemented in examples disclosed herein. In this example, the sensor implementation includes two different sensors 702, 704. In particular, the sensors 702, 704 are different sensor types implemented at the same longitudinal portion or length of the roll-forming apparatus 700, for example. The example sensor implementation of FIG. 7 may be advantageous for situations in which different sides of material being roll-formed may have different dimensions (e.g., different dimensional scales) or necessitate different control parameters. Moreover, the example sensor implementation may be advantageous for scenarios in which the material has a non-symmetric cross-sectional profile.

Figure 8A:
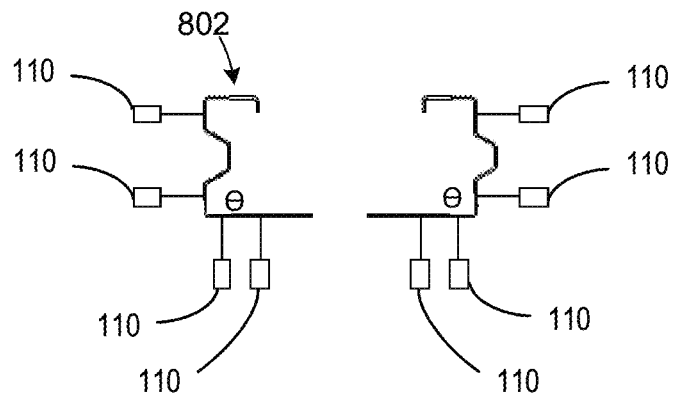
FIGS. 8A-8D depict example sensor arrangements that can be implemented in examples disclosed herein.

FIGS. 8A-8D depict example sensor arrangements that can be implemented in examples disclosed herein. Turning to FIG. 8A, a frontal view along a direction of travel of material 802 being roll-formed is shown. In this example, multiple ones of the sensors 110 are implemented as single point displacement laser sensors and positioned son each side of the material 802 (in the view of FIG. 8) to measure multiple dimensions (e.g., multiple linear and radial/rotational dimensions) of the material 802 so that the roll-forming of the material 802 can be accurately controlled. In this example, pairs of the sensors 110 are oriented in substantially perpendicular directions (e.g., within 5 degrees of being perpendicular to one another) to other pairs of the sensors 110 on a respective side of the material 802. In other words, the sensors 110 are arranged in sets of perpendicular pairs in this example at each side of the material 802. In this example, implementing single point displacement laser sensors can be highly cost-effective.

Figure 8B:
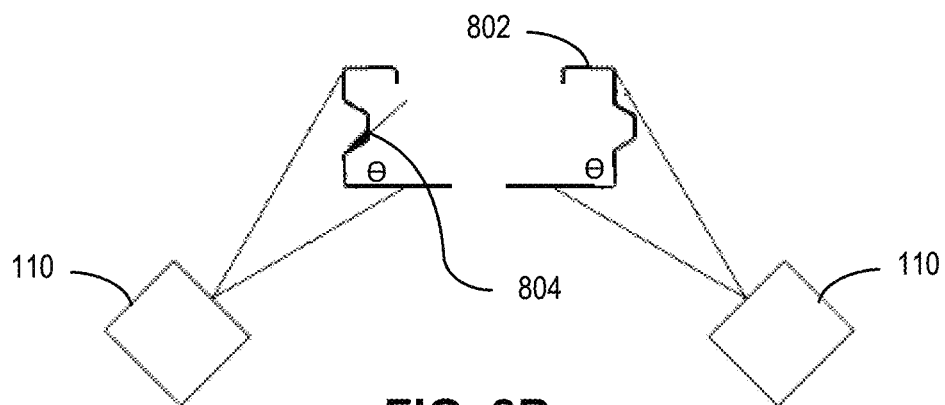

FIG. 8B depicts another example sensor arrangement that can be implemented in examples disclosed herein. In the illustrated example of FIG. 8B, two of the sensors 110 are arranged at opposed sides of a cross-sectional profile of the material 802 (in the view of FIG. 8B). In particular, the sensors 110 are angled from surfaces of the material 802 (e.g., oriented at angles toward bends and/or corners of the material 802). In some examples, "dead" zones 804, which are areas in which the sensors 110 cannot detect or have difficulty in detection, can result from the position and orientation of the sensors 110. However, in those examples, the dead zones 804 may not significantly reduce a capability to measure dimensions of the material 802. Particularly, the dead zones 804 may not be related to measured dimensions utilized for adjustment of the roll-forming process of the material 802.

Figure 8C:
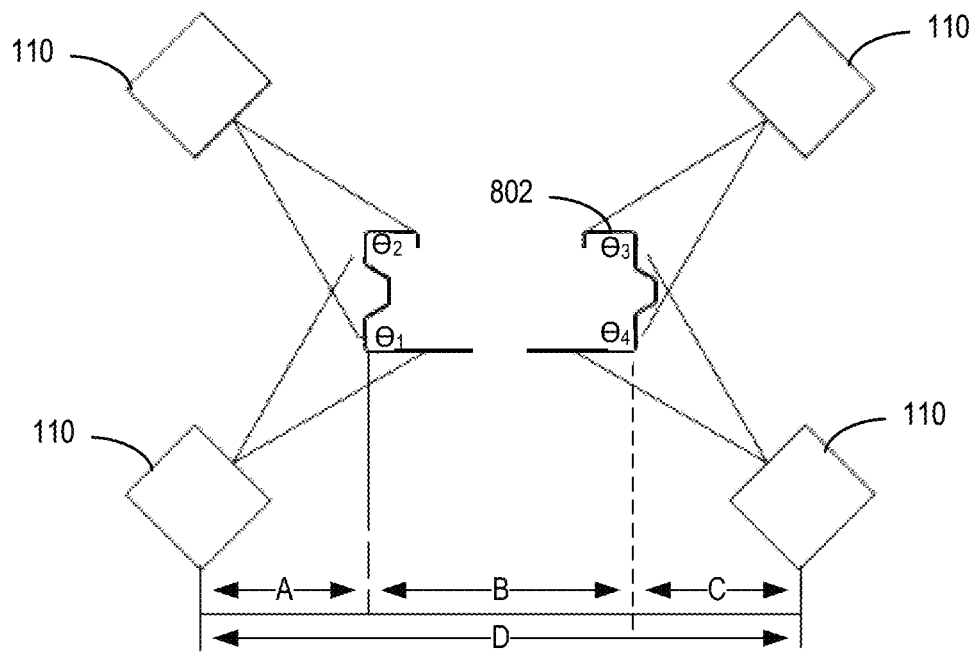

Turning to FIG. 8C, an example sensor implementation in which angular and linear dimensions are measured is shown. In this particular example, four of the sensors 110 are positioned proximate different corners of the material 802 and utilized to measure the material 802 in multiple dimensions. According to the illustrated example, the sensors 110 are able to measure and/or provide data so that angles, which are denoted by $\Theta_1$ to $\Theta_4$, are utilized to measure and/or characterize a condition of the material 802. Further, linear dimensions, which are denoted by A-D, are also utilized for adjustment of roll-forming of the material 802. For example, dimension B, which may be used to control roll-forming of the material 802, can be calculated based on subtracting measured dimensions A and C from measured dimension D (i.e., a calculation represented by B=D−(A+C)). In this example, numerous parameters are monitored in substantially real time, for example, for accurate control of the roll-forming process. Further, in this implementation, there are few, if any, "dead spots" on the external profile of the material 802, thereby enabling control of internal angles of the material 802 and linear dimensions of "tongue and groove" shapes on sides of vertical legs of the material 802, for example.

Figure 8D:
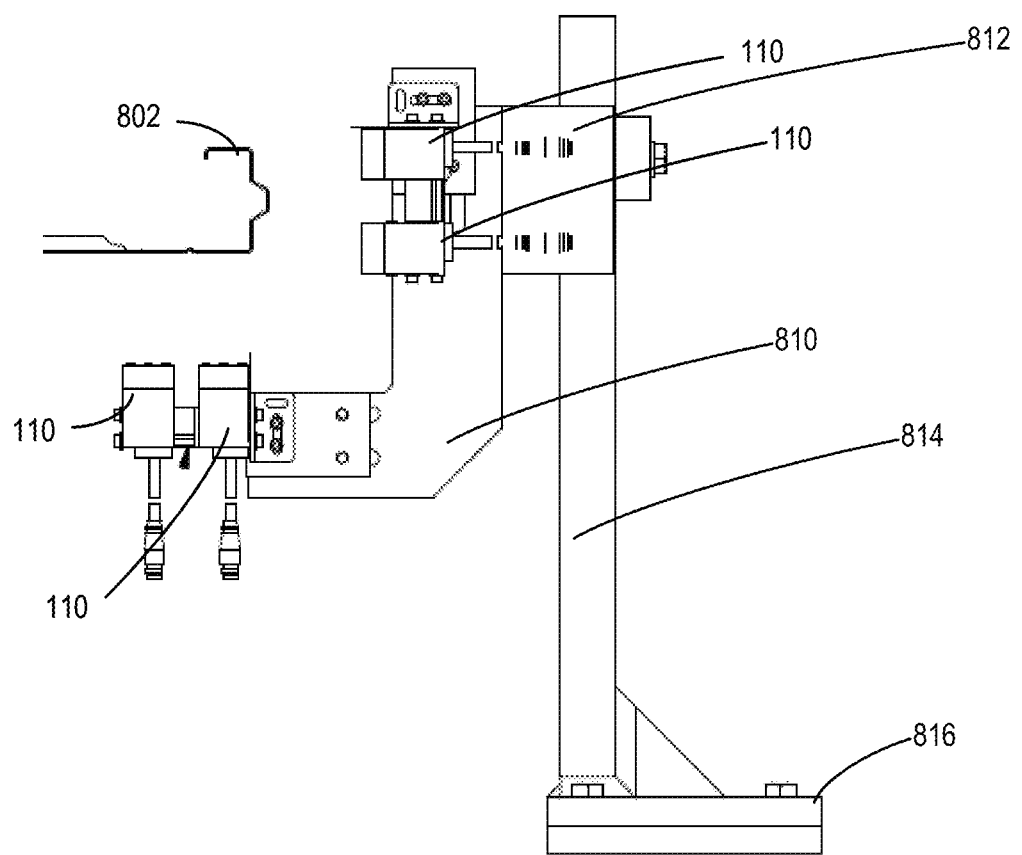

FIG. 8D depicts one side of an example sensor arrangement similar to that shown in FIG. 8A. In the illustrated example of FIG. 8D, each side of the material 802 is measured by four of the sensors 110 as pairs that are arranged substantially perpendicular to another pair at each side of the material 802. In this example, the sensors 110 are positioned and supported by a generally L-shaped arm 810. In turn, the arm 810 is held by a mount 812 that can be moved along a post 814 that is supported by a base 816. In this example, the mount 812 is movable to accommodate different material sizes and/or dimensions.

FIG. 9 is a schematic overview of the aforementioned example roll-forming analysis system 900 in accordance with teachings of this disclosure. The example roll-forming analysis system 900 processes and/or analyzes dimensions of the material 101, determines whether to adjust a roll-forming process of the material 101, and determines a degree of adjustment of the roll-forming process. The example roll-forming analysis system 900 can be implemented in the roll-forming apparatus 100, the controller 130, the example adjustment circuitry 132 and/or the remote server 142. The example roll-forming analysis system 900 includes example sensor analyzer circuitry (e.g., means for analyzing sensor data, means for processing sensor data) 904 communicatively coupled to the sensor 110, example geometry analyzer circuitry (e.g., means for analyzing geometry) 906, example material adjuster circuitry (e.g., means for adjusting) 908 communicatively coupled to the controller 130, and example model trainer circuitry (e.g., means for training a model) 910, all of which can be communicatively coupled to the example storage 134, 144. In some examples, at least one of the example storage 134, 144 can include and/or store a training/trained model 912, for example.

In the illustrated example, the sensor analyzer circuitry 904 collects, processes and/or retrieves dimensional measurement(s) and/or data obtained by the sensor 110. In some examples, the dimensions from the sensor 110 include both linear dimensions and angular dimensions. In some such examples, the sensor analyzer circuitry 904 categorizes the dimensions as either linear or angular. Additionally or alternatively, the sensor analyzer circuitry 904 determines whether the dimensional measurements are valid (e.g., possible).

The geometry analyzer circuitry 906 analyzes a measured dimension to determine whether to adjust the roll-forming process by comparing the dimension to a tolerance, threshold range and/or a value (e.g., a predetermined value). In this example, if the dimension obtained by the sensor is not within a defined tolerance range, the geometry analyzer circuitry 906 determines the difference between the dimension and the nominal/desired value and indicates that the roll-forming process is to be adjusted, for example. Conversely, if the dimension is within the tolerance range, the geometry analyzer circuitry 906 indicates that the roll-forming process does not need to be adjusted. In some examples, the geometry analyzer circuitry 906 analyzes, calculates and/or determines a flare of the material 101 based on the at least one dimension obtained by the sensor 110. Additionally or alternatively, the example geometry analyzer circuitry 906 calculates and/or generates a 3-D representation and/or a point cloud (e.g., a point cloud representation) of the material 101 based on sensor data from the sensor 110. Additionally or alternatively, the geometry analyzer circuitry 906 selects a function from a plurality of functions based on the dimension. In such examples, the function can be utilized to define an adjustment of at least one of the plurality of rollers.

The example material adjuster circuitry 908 of the illustrated example controls and/or directs movement of one of the rollers 120 or multiple ones of the rollers 120 in the roll-forming apparatus 100 based on the dimension to adjust the process. The example adjustment circuitry can determine a degree to adjust the process (e.g., rotational and/or translational movement(s) of ones of the rollers 120). In some examples, the material adjuster circuitry 908 calculates the adjustment of at least two of the rollers 120 (e.g., simultaneously, in a sequential order, in an overlapping sequence, etc.). Additionally or alternatively, the material adjuster circuitry 908 controls the adjustment of the rollers 120 based on the aforementioned 3-D representation and/or the point cloud mentioned above. Additionally or alternatively, the material adjuster circuitry 908 selects a function from a plurality of functions based on the dimension. In such examples, the function can be utilized to define an adjustment of at least one of the plurality of rollers. In some examples, the material adjuster circuitry 908 determines the adjustment at least partially based on a material identifier (e.g., a material lot identifier) of the material 101. In some such examples, the material adjuster circuitry 908 takes into account a production lot of the material 101 and/or utilizes historical data associated with different identifiers of the material 101. In some such examples, a model trained based on the material identifier and/or production information, such as the production lot, may be utilized by the material adjuster circuitry 908 to determine the adjustment of at least one of the rollers 120.

In some examples, the example model trainer circuitry 910 is implemented. The example model trainer circuitry can be communicatively coupled to the sensor analyzer circuitry 904, the geometry analyzer circuitry 906, and/or the material adjuster circuitry 908. The model trainer circuitry 910 can be implemented to train the model 912 based on measuring the material 101 at or near an inlet of the roll-forming apparatus 100 and measuring the material 101 at or near an outlet of the roll-forming apparatus 100, as well as at or near an inlet of the roll-forming apparatus 100 (e.g., while a known or defined degree of roll-forming is performed). In some such examples, the material 101 used to train the model 912 is scrapped subsequent to training the model 912 and/or further development of the model 912.

The model trainer circuitry 910 can be implemented on the controller 130, the adjustment circuitry 132, another roll-forming machine, and/or the servers 142. In yet other examples, the training of the model 912 is performed at the servers 142 based on sensor data from the sensor 110. In such examples, the model 912 can be trained from sensor data associated with multiple roll-forming machines and/or roll-forming production runs, for example. In some examples, the model trainer circuitry 910 performs a statistical analysis of why material was scrapped (e.g., during a training phase).

In examples where training models are implemented, many different types of machine learning models and/or machine learning architectures can be implemented. In examples disclosed herein, a roll-forming training model can be used. For example, implementing a trained roll-forming material model enables accurate control of subsequently produced roll-formed parts. In general, machine learning models/architectures that are suitable to use in the example approaches disclosed herein can be a CNN/DNN in which interconnections are not visible outside the model, or a network like a Graph Neural Network (GNN). However, other types of machine learning models could additionally or alternatively be used.

While an example manner of implementing the roll-forming analysis system 900 of FIG. 9 is illustrated in FIG. 9, one or more of the elements, processes, and/or devices illustrated in FIG. 9 may be combined, divided, re-arranged, omitted, eliminated, and/or implemented in any other way. Further, the example sensor analyzer circuitry 904, the example geometry analyzer circuitry 906, the example material adjuster circuitry 908, the example model trainer circuitry 910, the example controller 130 and/or, more generally, the example roll-forming analysis system 900 of FIG. 9, may be implemented by hardware, software, firmware, and/or any combination of hardware, software, and/or firmware. Thus, for example, any of the example sensor analyzer circuitry 904, the example geometry analyzer circuitry 906, the example material adjuster circuitry 908, the example model trainer circuitry 910, the example controller 130, and/or, more generally, the example roll-forming analysis system 900 of FIG. 9, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example sensor analyzer circuitry 904, the example geometry analyzer circuitry 906, the example material adjuster circuitry 908, the example model trainer circuitry 910, and/or the example controller 130 is/are hereby expressly defined to include a non-transitory computer readable storage device or storage disk such as a memory, a digital versatile disk (DVD), a compact disk (CD), a Blu-ray disk, etc., including the software and/or firmware. Further still, the example roll-forming analysis system 900 of FIG. 9 may include one or more elements, processes, and/or devices in addition to, or instead of, those illustrated in FIG. 9, and/or may include more than one of any or all of the illustrated elements, processes and devices.

Flowcharts representative of example hardware logic circuitry, machine readable instructions, hardware implemented state machines, and/or any combination thereof for implementing the roll-forming analysis system 900 of FIG. 9 are shown in FIGS. 10A-12. The machine readable instructions may be one or more executable programs or portion(s) of an executable program for execution by processor circuitry, such as the processor circuitry 1312 shown in the example processor platform 1300 discussed below in connection with FIG. 13 and/or the example processor circuitry discussed below in connection with FIGS. 14 and/or 15. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 10A-12, many other methods of implementing the example roll-forming analysis system 900 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 10A-12 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 10A:
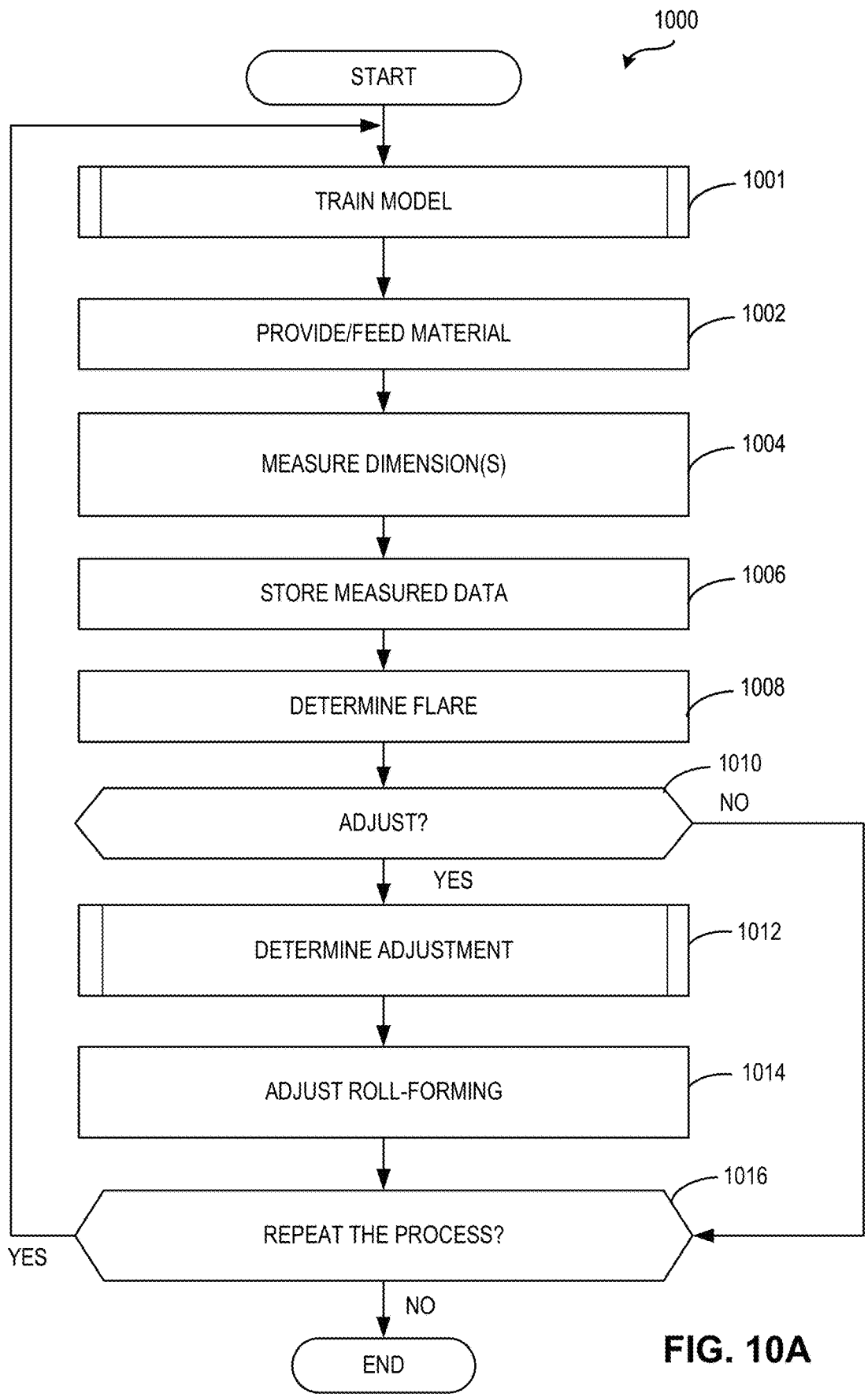
FIGS. 10A-12 are flowcharts representative of example machine readable instructions that may be executed by example processor circuitry to implement the example roll-forming apparatus of FIG. 1 and/or the example roll-forming analysis system of FIG. 9.

FIG. 10A is a flowchart representative of example machine readable instructions and/or example operations 1000 that may be executed and/or instantiated by processor circuitry to control operation of the roll-forming apparatus 100 based on measuring the material 101 via the sensor 110. The machine readable instructions and/or operations 1000 of FIG. 10A begin as the material 101 is provided to the roll-processing apparatus 100 for roll-forming thereof. In some other examples, as will be described below in connection with FIG. 10B, the material 101 is provided to the roll-forming apparatus 100 such that the roll-forming apparatus 100 determines whether the roll-formed material 101 is conforming within standards (e.g., tolerances, etc.) and does not adjust roll-forming of the material 101 when the material 101 is not conforming and, instead, rejects the material 101 based on non-conformance.

At block 1001, in some examples where trained/training models are utilized for AI/ML implementations, the example model trainer circuitry 910 trains a model (e.g., the model 912), as described in greater detail below in connection with FIG. 12. Additionally or alternatively, the model, which may be fully trained, partially trained or an initial model, is downloaded from the server 142.

At block 1002, the material 101 is provided and/or fed to the roll-forming apparatus 100 based on outputs from the controller 130 and/or the material adjuster circuitry 908.

At block 1004, the sensor 110 and/or the sensor analyzer circuitry 904 measures and/or determines at least one dimension of the material 101 as the material 101 is moved through the roll-forming apparatus 100. In some examples, the sensor analyzer circuitry 904 determines the at least one dimension from signals (e.g., sensor output signals) and/or sensor output of the sensor 110. The sensor output may come from the sensor 110 at an outlet of the roll-forming apparatus, the exit portion 104 and/or the intermediate portion 106, for example. Additionally or alternatively, the sensor 110 can provide the senor output from the input portion 108.

At block 1006, the sensor analyzer circuitry 904 stores data. associated with the at least one dimension in the storage 134 and/or the storage 144.

At block 1008, in some examples, the geometry analyzer circuitry 906 determines an amount of flare of the material 101.

At block 1010, the geometry analyzer circuitry 906 of the illustrated example determines whether to adjust roll-forming of the material 101. If roll-forming is to be adjusted (block 1010), control of the process proceeds to block 1012. Otherwise, the process proceeds to block 1016.

According to the illustrated example, at block 1012, an adjustment of at least one of the rollers 120 and/or the rollers 402 is determined based on the at least one dimension, as will be discussed in greater detail below in connection with FIG. 11. Additionally or alternatively, the determination of the adjustment is based on the determined flare of the material 101.

At block 1014, the roll-forming of the material 101 is adjusted based on the adjustment, as will be discussed in greater detail below in connection with FIG. 11.

At block 1016, it is determined whether to repeat the process. If the process is to be repeated (block 1016), control of the process returns to block 1001. Otherwise, the process ends. This determination may be based on whether additional material is to be roll-formed and/or whether the roll-forming process is to be stopped (e.g., based on non-conformance, a process drift, etc.).

Figure 10B:
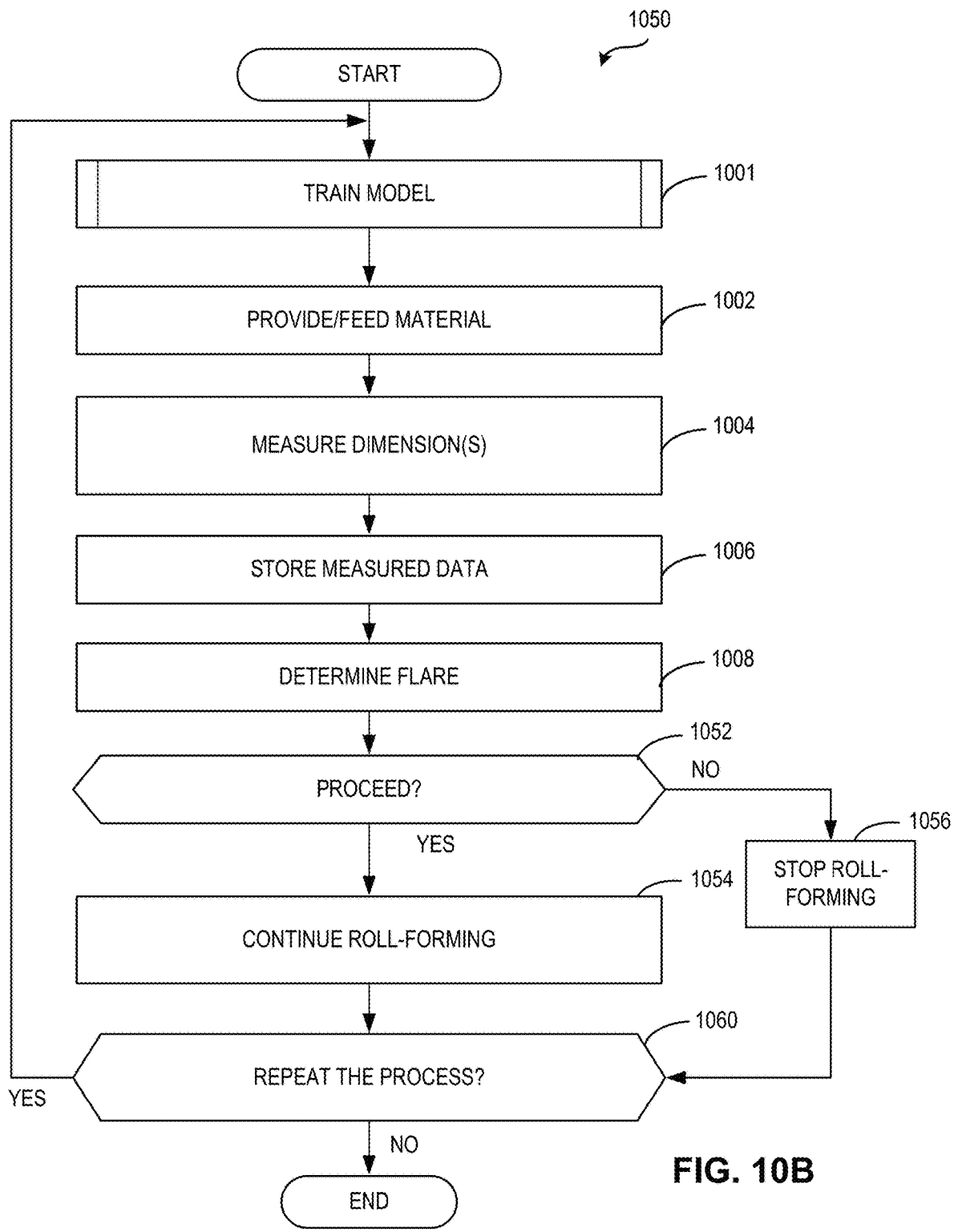

FIG. 10B is a flowchart representative of example machine readable instructions and/or example operations 1050 that may be executed and/or instantiated by processor circuitry to control operation of the roll-forming apparatus 100 based on measuring the material 101 via the sensor 110. The operations 1050 of similar to the operations of 1000 of FIG. 10A but instead of adjusting the roll-forming process, the roll-forming apparatus 100 is used to measure the material 101 and determine whether to continue roll-forming based on sensor output from sensor 110 (e.g., a go/no-go implementation). In other words, the material 101 is measured as it moves through the roll-forming apparatus 100 by the sensor 110. Based on sensor output (e.g., sensor output signals of the sensor 110, if the material 101 is not within tolerance and/or not conforming to desired geometric parameters, the roll-forming apparatus 101 is stopped. Accordingly, in this example, blocks 1001-1008 are similar to that of the example operations 1000. However, in some examples, the operations of 1050 are implemented to train a model, such as the model 912 of FIG. 9. In such examples, block 1001 may not be performed and, instead, training is performed as the material 101 is roll-formed with the operations 1050, for example.

At block 1052, the example geometry analyzer circuitry analyzer 906 determines whether to proceed and/or continue with roll-forming based on sensor outputs from the sensor 110 as the material 101 is moved through the roll-forming machine 100. In the illustrated example, the material 101 is monitored for conformance and production is ceased when the roll-forming process is not conforming. For example, the roll-forming of the material 101 is controlled based on a determined relationship between inputs and outputs of the material 101 during a training phase of a model and sensor output and/or sensor data from the sensor(s) 110 is only used for determining that the roll-forming process based on the trained model is compliant and, thus, roll-forming is to continue. In this example, the roll-forming apparatus 100 runs in a go/no-go mode while maintaining a relationship based on the trained model. In some examples, sensor outputs from the outlet portion 104 and the inlet portion 108 are utilized in monitoring the material 101. Additionally or alternatively sensor output from the intermediate portion 106 is utilized to monitor the material 101. If the roll-forming is to proceed (block 1052), control of the process proceeds to block 1054. Otherwise, the process proceeds to block 1056.

At block 1054, the example geometry analyzer circuitry 906 enables and/or allows the roll-forming process of the material 101 to continue and the process proceeds to block 1060.

At block 1056, the example geometry analyzer circuitry 906 stops and/or disables the roll-forming process and the process proceeds to block 1060. In some examples, an operator to makes adjustments (e.g., adjustments determined and/or calculated by the controller 130) if roll-formed parts/components produced are not compliant.

At block 1060, it is determined whether to repeat the process. If the process is to be repeated (block 1060), control of the process returns to block 1001. Otherwise, the process ends. This determination may be based on whether additional material is to be roll-formed and/or whether the roll-forming process is to be stopped (e.g., based on non-conformance, a process drift, etc.).

Figure 11:
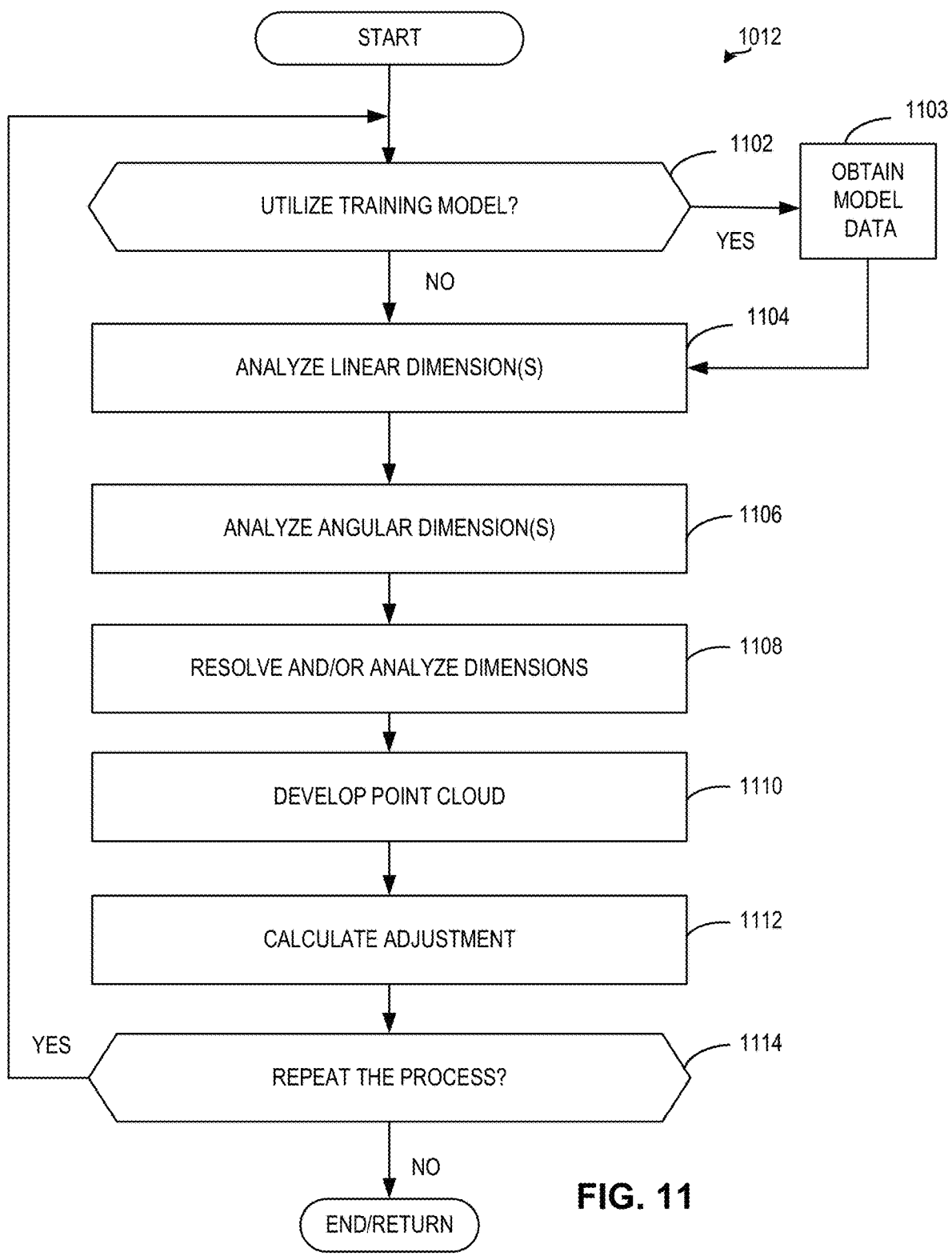

FIG. 11 is a flowchart representative of an example subroutine 1012 of the operations 1000 of FIG. 10A. In the illustrated example of FIG. 11, an adjustment of at least one of the rollers 120 is being determined based on sensor data from at least one of the sensors 110.

At block 1102, in some examples where trained/training models are utilized, the geometry analyzer circuitry 906 and/or the material adjuster circuitry 908 determines whether to utilize the training model in an inference phase. If the training model is to be utilized (block 1102), control of the process proceeds to block 1103. Otherwise, the process proceeds to block 1104.

At block 1103, the geometry analyzer circuitry 906 obtains the model data and/or the model (e.g., via the network 140). In some examples, the model is trained by the model trainer circuitry 910 and stored in the storage 134 and/or the storage 144 for retrieval by the geometry analyzer circuitry 906.

At block 1104, the example geometry analyzer circuitry 906 analyzes at least one linear dimension of the material. In this example, the geometry analyzer circuitry 906 determines geometric parameters of the material 101 based on the at least one linear dimension from the sensor data received from the sensor 110.

At block 1106, the geometry analyzer circuitry 906 of the illustrated example analyzes at least one angular dimension of the material. In some examples, the at least one angular dimension is related to the at least one linear dimension (e.g., to construct a 2-D or 3-D representation of the material 101 based on a combination of linear and angular dimensions).

At block 1108, the example geometry analyzer circuitry 906 and/or the example material adjuster circuitry 908 resolves and/or analyzes the dimensions of the material 101. For example, the example geometry analyzer circuitry 906 and/or the example material adjuster circuitry 908 collects and/or analyzes multiple dimensions to determine and/or characterize geometric properties of the material 101 as the material 101 is moved through the roll-forming apparatus 100.

At block 1110, in some examples, the geometry analyzer circuitry 906 develops a point cloud model and/or representation of the material 101. In such examples, the point cloud model and/or the representation can be used to determine whether the material 101 being roll-formed is conforming within tolerance and/or geometric requirements.

At block 1112, the geometry analyzer circuitry 906 and/or the example material adjuster circuitry 908 calculates an adjustment to be made to the roll-forming process. In the illustrated example, the material adjuster circuitry 908 selects and/or determines the rollers 120 to be adjusted as well as a degree to which the selected and/or the determined rollers are to be adjusted by being moved (e.g., pivotably moved, translationally moved).

At block 1114, it is determined by the geometry analyzer circuitry 906 and/or the example material adjuster circuitry 908 whether to repeat the process. If the process is to be repeated (block 1114), control of the process returns to block 1102. Otherwise, the process ends/returns. This determination may be based on whether an adjustment was able to be calculated.

Figure 12:
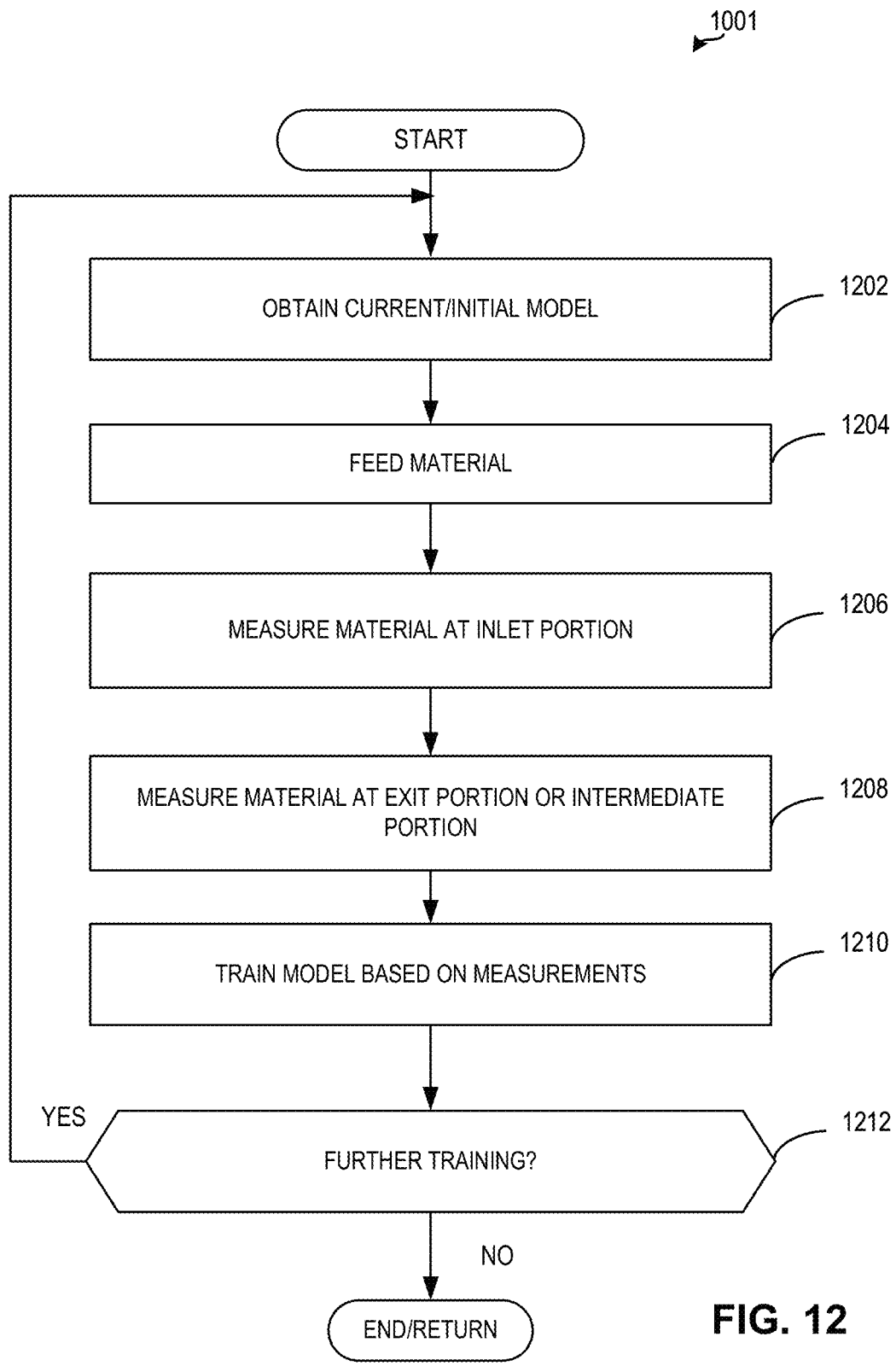

FIG. 12 is a flowchart representative of an example subroutine 1001 of the operations 1000 and/or the operations 1050. In the illustrated example of FIG. 12, a model, such as the model 912, is being trained and/or further trained for an implementation phase on the roll-forming apparatus 100. In other examples, the model may be trained on the roll-forming apparatus 100 or another roll-forming machine (e.g., a remote roll-forming machine at another location).

At block 1202, the example model trainer circuitry 910 obtains a model which may or may not be a machine learning model. In some examples, the model can be partially trained or un-trained.

At block 1204, the example model trainer circuitry 910 and/or the material adjust circuitry 908 causes the material 101 to be provided/fed to the inlet portion 108 of the roll-forming apparatus 100.

At block 1206, in this example, the sensor 110 positioned at or proximate the inlet portion 108 measures the material 101 at the inlet portion 108 of the roll-forming apparatus 100.

At block 1208, in some examples, the sensor 110 measures the material 101 at or proximate the outlet portion 104 or the intermediate portion 106 of the roll-forming apparatus 100.

At block 1210, the example model trainer circuitry 910 trains the model based on the measurements obtained by the sensor 110 at the inlet portion 108, as well as the sensor 110 at the outlet portion 104. In this particular example, first measurements at the inlet portion 108 are utilized in conjunction with second measurements at the outlet portion 104 to train the aforementioned model.

At block 1212, it is determined whether the model requires further training. If the model does require further training (block 1212), control of the process returns to block 1202. Otherwise, the process ends/returns.

Figure 13:
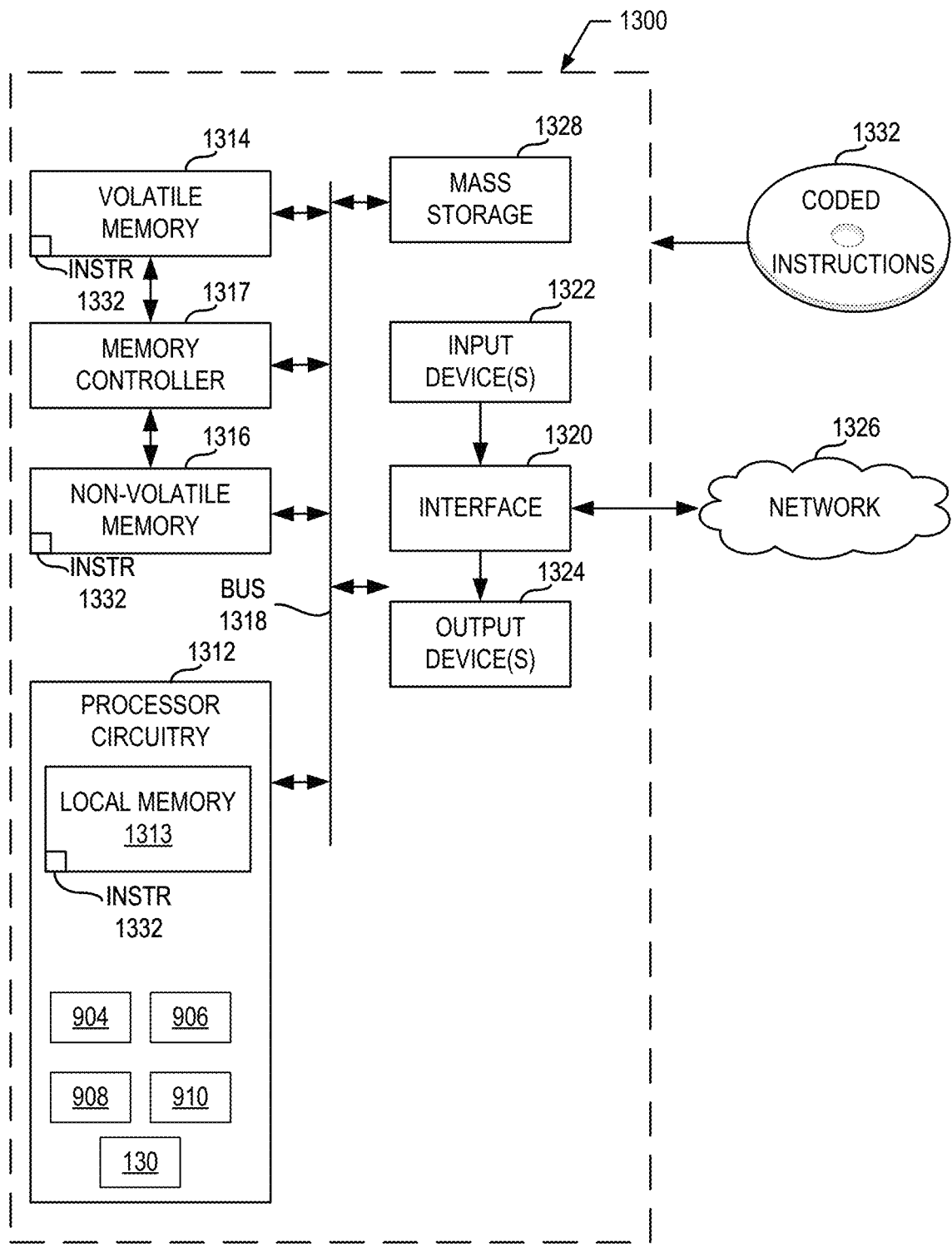
FIG. 13 is a block diagram of an example processing platform including processor circuitry structured to execute the example machine readable instructions of FIGS. 10A-12 to implement the example roll-forming apparatus.

FIG. 13 is a block diagram of an example processor platform 1300 structured to execute and/or instantiate the machine readable instructions and/or operations of FIGS. 10A-12 to implement the roll-forming analysis system 900 of FIG. 9. The processor platform 1300 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1300 of the illustrated example includes processor circuitry 1312. The processor circuitry 1312 of the illustrated example is hardware. For example, the processor circuitry 1312 can be implemented by one or more integrated circuits, logic circuits, FPGAs microprocessors, CPUs, GPUs, DSPs, and/or microcontrollers from any desired family or manufacturer. The processor circuitry 1312 may be implemented by one or more semiconductor based (e.g., silicon based) devices. In this example, the processor circuitry 1312 implements the example controller 130, the example sensor analyzer circuitry 904, the example geometry analyzer circuitry 906, the example material adjuster circuitry 908 and the example model trainer circuitry 910.

The processor circuitry 1312 of the illustrated example includes a local memory 1313 (e.g., a cache, registers, etc.). The processor circuitry 1312 of the illustrated example is in communication with a main memory including a volatile memory 1314 and a non-volatile memory 1316 by a bus 1318. The volatile memory 1314 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1316 may be implemented by flash memory and/or any other desired type of memory device. Access to the main memory 1314, 1316 of the illustrated example is controlled by a memory controller 1317.

The processor platform 1300 of the illustrated example also includes interface circuitry 1320. The interface circuitry 1320 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 1322 are connected to the interface circuitry 1320. The input device(s) 1322 permit(s) a user to enter data and/or commands into the processor circuitry 1312. The input device(s) 1322 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1324 are also connected to the interface circuitry 1320 of the illustrated example. The output devices 1324 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1320 of the illustrated example, thus, typically includes a graphics driver card, a graphics driver chip, and/or graphics processor circuitry such as a GPU.

The interface circuitry 1320 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1326. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1300 of the illustrated example also includes one or more mass storage devices 1328 to store software and/or data. Examples of such mass storage devices 1328 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 1332, which may be implemented by the machine readable instructions of FIGS. 10A-12, may be stored in the mass storage device 1328, in the volatile memory 1314, in the non-volatile memory 1316, and/or on a removable non-transitory computer readable storage medium such as a CD or DVD.

Figure 14:
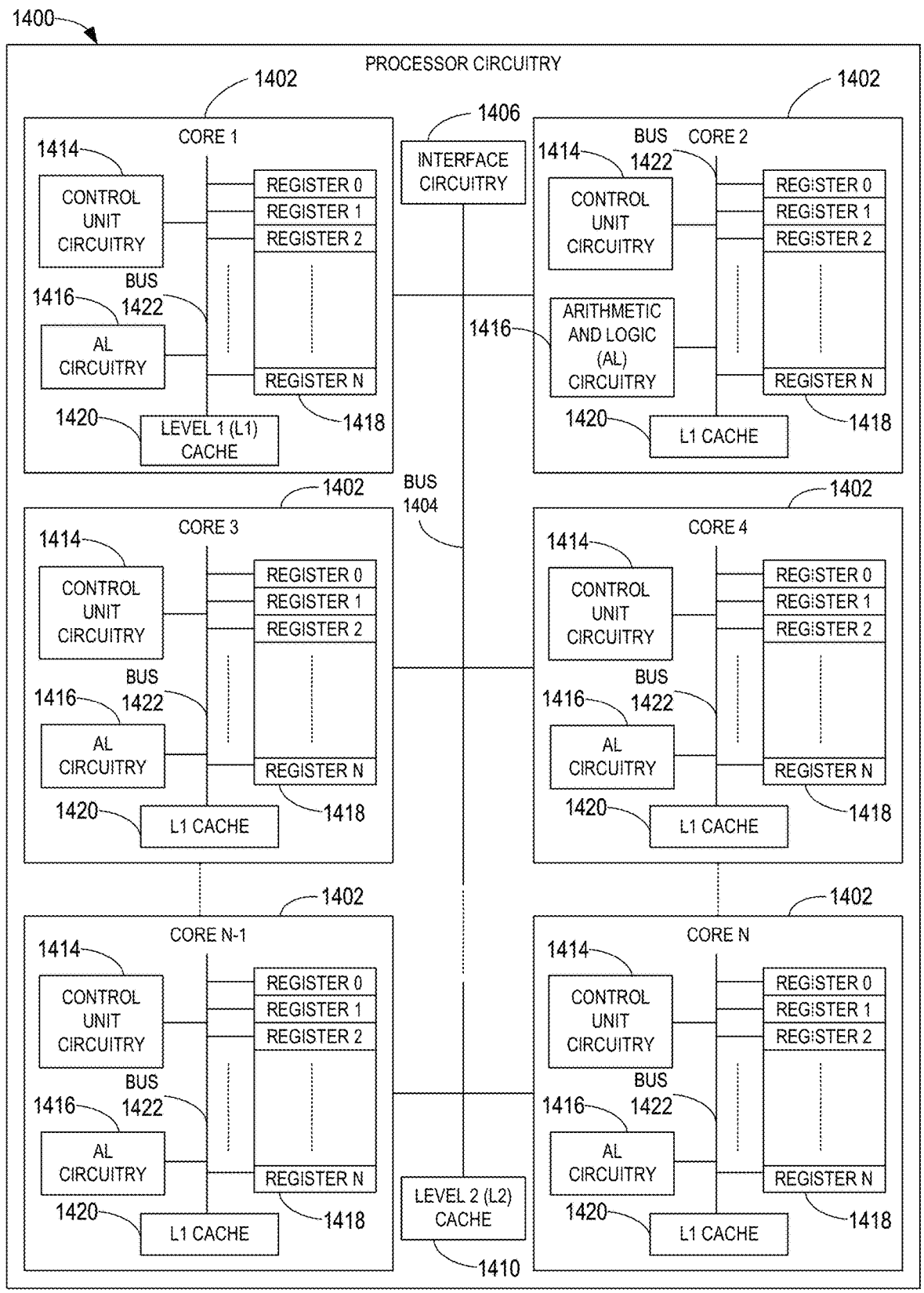
FIG. 14 is a block diagram of an example implementation of the processor circuitry of FIG. 13.

FIG. 14 is a block diagram of an example implementation of the processor circuitry 1312 of FIG. 13. In this example, the processor circuitry 1312 of FIG. 13 is implemented by a microprocessor 1400. For example, the microprocessor 1400 may implement multi-core hardware circuitry such as a CPU, a DSP, a GPU, an XPU, etc. Although it may include any number of example cores 1402 (e.g., 1 core), the microprocessor 1400 of this example is a multi-core semiconductor device including N cores. The cores 1402 of the microprocessor 1400 may operate independently or may cooperate to execute machine readable instructions. For example, machine code corresponding to a firmware program, an embedded software program, or a software program may be executed by one of the cores 1402 or may be executed by multiple ones of the cores 1402 at the same or different times. In some examples, the machine code corresponding to the firmware program, the embedded software program, or the software program is split into threads and executed in parallel by two or more of the cores 1402. The software program may correspond to a portion or all of the machine readable instructions and/or operations represented by the flowcharts of FIGS. 10A-12.

The cores 1402 may communicate by an example bus 1404. In some examples, the bus 1404 may implement a communication bus to effectuate communication associated with one(s) of the cores 1402. For example, the bus 1404 may implement at least one of an Inter-Integrated Circuit (I2C) bus, a Serial Peripheral Interface (SPI) bus, a PCI bus, or a PCIe bus. Additionally or alternatively, the bus 1404 may implement any other type of computing or electrical bus. The cores 1402 may obtain data, instructions, and/or signals from one or more external devices by example interface circuitry 1406. The cores 1402 may output data, instructions, and/or signals to the one or more external devices by the interface circuitry 1406. Although the cores 1402 of this example include example local memory 1420 (e.g., Level 1 (L1) cache that may be split into an L1 data cache and an L1 instruction cache), the microprocessor 1400 also includes example shared memory 1410 that may be shared by the cores (e.g., Level 2 (L2_ cache)) for high-speed access to data and/or instructions. Data and/or instructions may be transferred (e.g., shared) by writing to and/or reading from the shared memory 1410. The local memory 1420 of each of the cores 1402 and the shared memory 1410 may be part of a hierarchy of storage devices including multiple levels of cache memory and the main memory (e.g., the main memory 1314, 1316 of FIG. 13). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1402 may be referred to as a CPU, DSP, GPU, etc., or any other type of hardware circuitry. Each core 1402 includes control unit circuitry 1414, arithmetic and logic (AL) circuitry (sometimes referred to as an ALU) 1416, a plurality of registers 1418, the L1 cache 1420, and an example bus 1422. Other structures may be present. For example, each core 1402 may include vector unit circuitry, single instruction multiple data (SIMD) unit circuitry, load/store unit (LSU) circuitry, branch/jump unit circuitry, floating-point unit (FPU) circuitry, etc. The control unit circuitry 1414 includes semiconductor-based circuits structured to control (e.g., coordinate) data movement within the corresponding core 1402. The AL circuitry 1416 includes semiconductor-based circuits structured to perform one or more mathematic and/or logic operations on the data within the corresponding core 1402. The AL circuitry 1416 of some examples performs integer based operations. In other examples, the AL circuitry 1416 also performs floating point operations. In yet other examples, the AL circuitry 1416 may include first AL circuitry that performs integer based operations and second AL circuitry that performs floating point operations. In some examples, the AL circuitry 1416 may be referred to as an Arithmetic Logic Unit (ALU). The registers 1418 are semiconductor-based structures to store data and/or instructions such as results of one or more of the operations performed by the AL circuitry 1416 of the corresponding core 1402. For example, the registers 1418 may include vector register(s), SIMD register(s), general purpose register(s), flag register(s), segment register(s), machine specific register(s), instruction pointer register(s), control register(s), debug register(s), memory management register(s), machine check register(s), etc. The registers 1418 may be arranged in a bank as shown in FIG. 14. Alternatively, the registers 1418 may be organized in any other arrangement, format, or structure including distributed throughout the core 1402 to shorten access time. The bus 1420 may implement at least one of an I2C bus, a SPI bus, a PCI bus, or a PCIe bus Each core 1402 and/or, more generally, the microprocessor 1400 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1400 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 15:
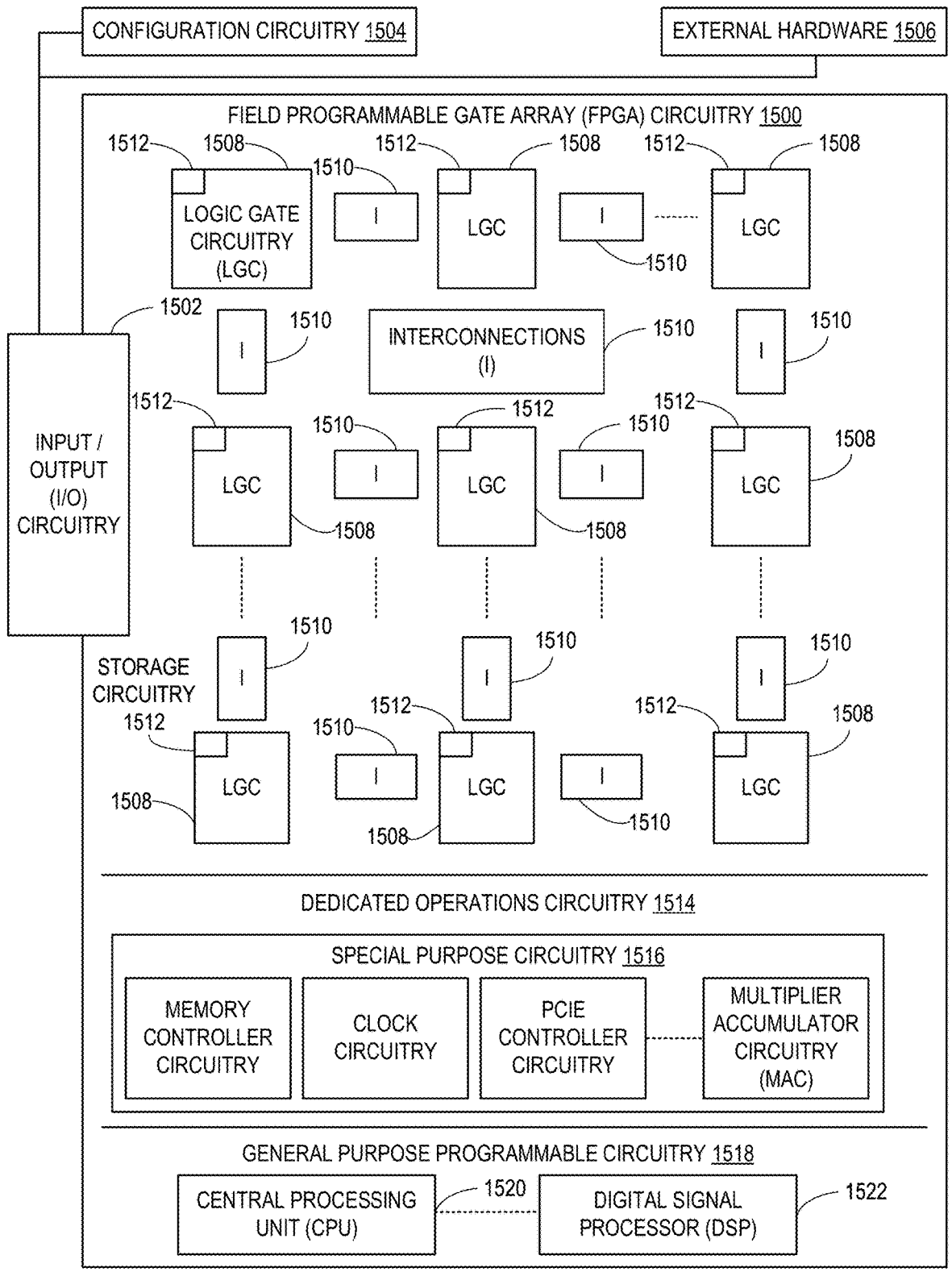
FIG. 15 is a block diagram of another example implementation of the processor circuitry of FIG. 13.

FIG. 15 is a block diagram of another example implementation of the processor circuitry 1312 of FIG. 13. In this example, the processor circuitry 1312 is implemented by FPGA circuitry 1500. The FPGA circuitry 1500 can be used, for example, to perform operations that could otherwise be performed by the example microprocessor 1400 of FIG. 14 executing corresponding machine readable instructions. However, once configured, the FPGA circuitry 1500 instantiates the machine readable instructions in hardware and, thus, can often execute the operations faster than they could be performed by a general purpose microprocessor executing the corresponding software.

More specifically, in contrast to the microprocessor 1400 of FIG. 14 described above (which is a general purpose device that may be programmed to execute some or all of the machine readable instructions represented by the flowcharts of FIGS. 10A-12 but whose interconnections and logic circuitry are fixed once fabricated), the FPGA circuitry 1500 of the example of FIG. 15 includes interconnections and logic circuitry that may be configured and/or interconnected in different ways after fabrication to instantiate, for example, some or all of the machine readable instructions represented by the flowcharts of FIGS. 10A-12. In particular, the FPGA 1500 may be thought of as an array of logic gates, interconnections, and switches. The switches can be programmed to change how the logic gates are interconnected by the interconnections, effectively forming one or more dedicated logic circuits (unless and until the FPGA circuitry 1500 is reprogrammed). The configured logic circuits enable the logic gates to cooperate in different ways to perform different operations on data received by input circuitry. Those operations may correspond to some or all of the software represented by the flowchart of FIG. 15. As such, the FPGA circuitry 1500 may be structured to effectively instantiate some or all of the machine readable instructions of the flowcharts of FIGS. 10A-12 as dedicated logic circuits to perform the operations corresponding to those software instructions in a dedicated manner analogous to an ASIC. Therefore, the FPGA circuitry 1500 may perform the operations corresponding to the some or all of the machine readable instructions of FIG. 15 faster than the general purpose microprocessor can execute the same.

In the example of FIG. 15, the FPGA circuitry 1500 is structured to be programmed (and/or reprogrammed one or more times) by an end user by a hardware description language (HDL) such as Verilog. The FPGA circuitry 1500 of FIG. 15, includes example input/output (I/O) circuitry 1502 to obtain and/or output data to/from example configuration circuitry 1504 and/or external hardware (e.g., external hardware circuitry) 1506. For example, the configuration circuitry 1504 may implement interface circuitry that may obtain machine readable instructions to configure the FPGA circuitry 1500, or portion(s) thereof. In some such examples, the configuration circuitry 1504 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1506 may implement the microprocessor 1400 of FIG. 14. The FPGA circuitry 1500 also includes an array of example logic gate circuitry 1508, a plurality of example configurable interconnections 1510, and example storage circuitry 1512. The logic gate circuitry 1508 and interconnections 1510 are configurable to instantiate one or more operations that may correspond to at least some of the machine readable instructions of FIGS. 10-12 and/or other desired operations. The logic gate circuitry 1508 shown in FIG. 15 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1508 to enable configuration of the electrical structures and/or the logic gates to form circuits to perform desired operations. The logic gate circuitry 1508 may include other electrical structures such as look-up tables (LUTs), registers (e.g., flip-flops or latches), multiplexers, etc.

The interconnections 1510 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1508 to program desired logic circuits.

The storage circuitry 1512 of the illustrated example is structured to store result(s) of the one or more of the operations performed by corresponding logic gates. The storage circuitry 1512 may be implemented by registers or the like. In the illustrated example, the storage circuitry 1512 is distributed amongst the logic gate circuitry 1508 to facilitate access and increase execution speed.

The example FPGA circuitry 1500 of FIG. 15 also includes example Dedicated Operations Circuitry 1514. In this example, the Dedicated Operations Circuitry 1514 includes special purpose circuitry 1516 that may be invoked to implement commonly used functions to avoid the need to program those functions in the field. Examples of such special purpose circuitry 1516 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1500 may also include example general purpose programmable circuitry 1518 such as an example CPU 1520 and/or an example DSP 1522. Other general purpose programmable circuitry 1518 may additionally or alternatively be present such as a GPU, an XPU, etc., that can be programmed to perform other operations.

Although FIGS. 14 and 15 illustrate two example implementations of the processor circuitry 1312 of FIG. 13, many other approaches are contemplated. For example, as mentioned above, modern FPGA circuitry may include an on-board CPU, such as one or more of the example CPU 1520 of FIG. 15. Therefore, the processor circuitry 1312 of FIG. 13 may additionally be implemented by combining the example microprocessor 1400 of FIG. 14 and the example FPGA circuitry 1500 of FIG. 15. In some such hybrid examples, a first portion of the machine readable instructions represented by the flowcharts of FIGS. 10A-12 may be executed by one or more of the cores 1402 of FIG. 14 and a second portion of the machine readable instructions represented by the flowcharts of FIGS. 10A-12 may be executed by the FPGA circuitry 1500 of FIG. 15.

In some examples, the processor circuitry 1312 of FIG. 13 may be in one or more packages. For example, the processor circuitry 1400 of FIG. 14 and/or the FPGA circuitry 1400 of FIG. 14 may be in one or more packages. In some examples, an XPU may be implemented by the processor circuitry 1312 of FIG. 13, which may be in one or more packages. For example, the XPU may include a CPU in one package, a DSP in another package, a GPU in yet another package, and an FPGA in still yet another package.

Figure 16:
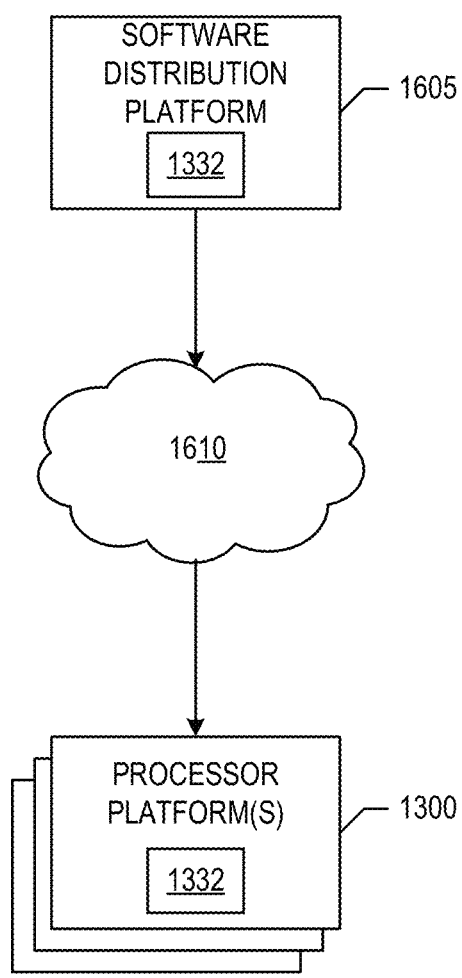
FIG. 16 is a block diagram of an example software distribution platform (e.g., one or more servers) to distribute software (e.g., software corresponding to the example machine readable instructions of FIGS. 10A-12) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, other manufacturers).

A block diagram illustrating an example software distribution platform 1605 to distribute software such as the example machine readable instructions 1332 of FIG. 13 to hardware devices owned and/or operated by third parties is illustrated in FIG. 16. The example software distribution platform 1605 may be implemented by any computer server, data facility, cloud service, etc., capable of storing and transmitting software to other computing devices. The third parties may be customers of the entity owning and/or operating the software distribution platform 1605. For example, the entity that owns and/or operates the software distribution platform 1605 may be a developer, a seller, and/or a licensor of software such as the example machine readable instructions 1332 of FIG. 13. The third parties may be consumers, users, retailers, OEMs, etc., who purchase and/or license the software for use and/or re-sale and/or sub-licensing. In the illustrated example, the software distribution platform 1605 includes one or more servers and one or more storage devices. The storage devices store the machine readable instructions 1332, which may correspond to the example machine readable instructions 1000 of FIGS. 10A-12, as described above. The one or more servers of the example software distribution platform 1605 are in communication with a network 1310, which may correspond to any one or more of the Internet and/or any of the example networks 140 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1332 from the software distribution platform 1605. For example, the software, which may correspond to the example machine readable instructions 1000 of FIG. 10A, may be downloaded to the example processor platform 1300, which is to execute the machine readable instructions 1332 to implement the roll-forming analysis system 900. In some example, one or more servers of the software distribution platform 1605 periodically offer, transmit, and/or force updates to the software (e.g., the example machine readable instructions 1332 of FIG. 13) to ensure improvements, patches, updates, etc., are distributed and applied to the software at the end user devices.

Further examples and combinations thereof include the following:

Example 1 includes a roll-forming apparatus comprising an inlet portion to receive material, an outlet portion from which the material exits the roll-forming apparatus, a plurality of rollers extending between the inlet and outlet portions, a sensor to measure at least one dimension of the material as the material moves through the roll-forming apparatus, the material measured by the sensor between the inlet and outlet portions, and material adjuster circuitry to adjust roll-forming of the material by moving at least one of the plurality of rollers based on the at least one dimension.

Example 2 includes the roll-forming apparatus as defined in example 1, wherein the sensor is positioned at or proximate the outlet portion.

Example 3 includes the roll-forming apparatus as defined in any of examples 2 or 3, wherein the material adjuster circuitry is to the at least one of the rollers that is positioned upstream of the sensor.

Example 4 includes the roll-forming apparatus as defined in any of examples 2 or 3, wherein the material adjuster circuitry is to move the at least one of the rollers that is positioned downstream of the sensor.

Example 5 includes the roll-forming apparatus as defined in any of examples 1 to 4, wherein the sensor is a first sensor, and further including a second sensor to measure the material at or proximate the inlet portion.

Example 6 includes the roll-forming apparatus as defined in example 5, further including a model trainer to train a model based on first and second data from the first and second sensors, respectively, the roll-forming of the material to be adjusted based on the first and second data.

Example 7 includes the roll-forming apparatus as defined in example 6, wherein the model is trained based on a plurality of different production sessions.

Example 8 includes the roll-forming apparatus as defined in any of examples 1 to 7, wherein the material adjuster circuitry is to select a function from a plurality of functions based on the at least one dimension, the function to define an adjustment of at least two of the plurality of rollers.

Example 9 includes the roll-forming apparatus as defined in any of examples 1 to 8, wherein the sensor is a first sensor, and further including a second sensor, the first sensor to measure a first dimension of the material and the second sensor to measure a second dimension of the material, the material adjuster circuitry to move the at least one of the plurality of rollers based on the first and second dimensions.

Example 10 includes the roll-forming apparatus as defined in example 9, wherein the first dimension is a linear dimension of the material and the second dimension is an angular dimension of the material.

Example 11 includes a method of controlling a roll-forming process, the method comprising moving, with a plurality of rollers, material through a roll-forming apparatus, the roll-forming apparatus including a plurality of rollers between an inlet portion of the roll-forming apparatus and an outlet portion of the roll-forming apparatus, measuring, with a sensor, at least one dimension of the material as the material moves through the roll-forming apparatus, the material measured by the sensor between the inlet and outlet portions, calculating, by executing instructions with at least one processor, an adjustment of at least one of the plurality of rollers based on the at least one dimension, and adjusting, by executing instructions with the at least one processor, roll-forming of the material by moving at least one of the plurality of rollers based on the calculated adjustment.

Example 12 includes the method as defined in example 11, wherein the moving of the at least one of the plurality of rollers is to occur upstream of the sensor.

Example 13 includes the method as defined in any of examples 11 or 12, further including training, with a model trainer, a model based on the at least one dimension.

Example 14 includes the method as defined in example 13, wherein the sensor is a first sensor, the training of the model based on first sensor data from the first sensor and second sensor data from a second sensor that is downstream of the first sensor.

Example 15 includes the method as defined in any of examples 11 to 14, wherein the sensor is to measure the at least one dimension after at least one forming pass of the roll-forming apparatus.

Example 16 includes the method as defined in any of examples 11 to 15, further including calculating a flare of the material based on the at least one dimension, wherein calculating the adjustment of the at least one of the rollers is based on the flare.

Example 17 includes the method as defined in example 16, wherein calculating the flare includes generating a point cloud representation of the material.

Example 18 includes the method as defined in any of examples 11 to 17, wherein the sensor is to measure at least one linear dimension and at least one angular dimension of the material.

Example 19 includes a computer readable medium comprising instructions, which when executed, cause at least one processor to determine at least one dimension of material as the material moves between inlet and outlet portions of a roll-forming apparatus based on sensor data from a sensor, the material moved by a plurality of rollers of the roll-forming apparatus, the material measured by the sensor between the inlet and outlet portions, calculate an adjustment of at least one of the plurality of rollers based on the at least one dimension, and adjust roll-forming of the material by causing at least one of the plurality of rollers to move based on the adjustment.

Example 20 includes the computer readable medium as defined in example 19, wherein the at least one of the plurality of rollers is adjusted upstream of the sensor.

Example 21 includes the computer readable medium as defined in any of examples 19 or 20, wherein the instructions cause the at least one processor to train a model based on the at least one dimension.

Example 22 includes the computer readable medium as defined in example 21, wherein the sensor is a first sensor, the model trained based on first sensor data from the first sensor and second sensor data from a second sensor that is downstream of the first sensor.

Example 23 includes the computer readable medium as defined in any of examples 19 to 22, wherein the instructions cause the at least one processor to calculate the adjustment of at least two of the rollers of the plurality of rollers.

Example 24 includes the computer readable medium as defined in any of examples 19 to 23, wherein the instructions cause the at least one processor to calculate a flare of the material based on the at least one dimension.

Example 25 includes the computer readable medium as defined in any of examples 19 to 24, wherein the instructions cause the at least one processor to generate a point cloud representation of the material.

Example 26 includes the computer readable medium as defined in example 25, wherein the adjustment of the at least one roller is calculated based on the point cloud representation.

From the foregoing, it will be appreciated that example systems, methods, apparatus, and articles of manufacture have been disclosed that enable accurate automated control of roll-forming processes. Examples disclosed herein can improve yields as well as accuracy of roll-formed components. Examples disclosed herein can utilize ML/AI to improve accuracy of parts produced. Examples disclosed herein can also leverage historical data from different production runs, different raw material yields, different roll-forming machines, etc. for improved part accuracy.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. A roll-forming apparatus to perform a roll-forming process, the apparatus comprising:
    an inlet portion to receive material;
    an outlet portion from which the material exits the roll-forming apparatus;
    a plurality of rollers extending between the inlet and outlet portions;
    a first sensor to measure first data of the material as the material moves through the roll-forming apparatus, the first data corresponding to measurements of the material between the inlet and outlet portions;
    a second sensor to measure second data, the second data corresponding to measurements of the material at or proximate the inlet portion;
    a model trainer to train a machine learning model with the first data, the second data and corresponding parameters of processed material; and
    material adjuster circuitry to:
        provide output from the first and second sensors as input to the machine learning model, the machine learning model to provide predicted output of the roll-forming process; and
        adjust the roll-forming process by moving at least one of the plurality of rollers based on the predicted output.

2. The roll-forming apparatus as defined in claim 1, wherein the first sensor is positioned at or proximate the outlet portion.

3. The roll-forming apparatus as defined in claim 1, wherein the material adjuster circuitry is to move the at least one of the rollers that is positioned upstream of the first sensor.

4. The roll-forming apparatus as defined in claim 1, wherein the material adjuster circuitry is to move the at least one of the rollers that is positioned downstream of the first sensor.

5. The roll-forming apparatus as defined in claim 1, wherein the machine learning model is trained over a plurality of different production sessions.

6. The roll-forming apparatus as defined in claim 1, wherein the material adjuster circuitry is to select a function from a plurality of functions based on at least one of the first or second data, the function to define an adjustment of at least two of the plurality of rollers.

7. The roll-forming apparatus as defined in claim 1, wherein the first sensor is to measure a first dimension of the material and the second sensor is to measure a second dimension of the material, the material adjuster circuitry to move the at least one of the plurality of rollers based on the first and second dimensions.

8. The roll-forming apparatus as defined in claim 7, wherein the first dimension is a linear dimension of the material and the second dimension is an angular dimension of the material.

9. The roll-forming apparatus as defined in claim 1, wherein the machine learning model is trained further based on a material identifier of the material received at the inlet portion.

10. The roll-forming apparatus as defined in claim 9, wherein the material identifier is related to a production lot corresponding to the material.

11. A method of controlling a roll-forming process, the method comprising:
    moving, with a plurality of rollers, material through a roll-forming apparatus, the roll-forming apparatus including a plurality of rollers between an inlet portion of the roll-forming apparatus and an outlet portion of the roll-forming apparatus;
    measuring, with a first sensor, first data of the material as the material moves through the roll-forming apparatus, the first data corresponding to measurements of the material between the inlet and outlet portions;
    measuring, with a second sensor, second data of the material as the material moves through the roll-forming apparatus, the second data corresponding to measurements of the material at or proximate the inlet portion;
    training, by executing instructions with at least one processor, a machine learning model with the first and second data, and corresponding parameters of processed material;
    providing, by executing instructions with at least one processor, output from the first and second sensors as input to the machine learning model, the machine learning model to provide predicted output of the roll-forming process;
    calculating, by executing instructions with the at least one processor, an adjustment of at least one of the plurality of rollers based on the predicted output; and
    adjusting, by executing instructions with the at least one processor, roll-forming of the material by moving at least one of the plurality of rollers based on the calculated adjustment.

12. The method as defined in claim 11, wherein the moving of the at least one of the plurality of rollers is to occur upstream of the first sensor.

13. The method as defined in claim 11, wherein the first sensor is to measure the material between the inlet and outlet portions after at least one forming pass of the roll-forming apparatus.

14. The method as defined in claim 11, further including calculating, by executing instructions with the at least one processor, a flare of the material based on the first data, wherein the calculating the adjustment of the at least one of the rollers is based on the flare.

15. The method as defined in claim 14, wherein calculating the flare includes generating a point cloud representation of the material.

16. The method as defined in claim 11, wherein the first sensor is to measure at least one linear dimension and at least one angular dimension of the material.

17. A computer readable medium comprising instructions that cause at least one processor to:
    train a machine learning model with first and second data from first and second sensors, respectively, and corresponding parameters of processed material, the first data corresponding to measurements of material between inlet and outlet portions of a roll-forming apparatus as the material moves between the inlet and outlet portions in a roll-forming process, the material moved by a plurality of rollers of the roll-forming apparatus, the second data corresponding to measurements of the material at or proximate the inlet portion;
    provide output from the first and second sensors as input to the machine learning model, the machine learning model to provide predicted output of the roll-forming process;
    calculate an adjustment of at least one of the plurality of rollers based on the predicted output from the machine learning model; and
    adjust roll-forming of the material by causing at least one of the plurality of rollers to move based on the adjustment.

18. The computer readable medium as defined in claim 17, wherein the at least one of the plurality of rollers is adjusted upstream of the first sensor.

19. The computer readable medium as defined in claim 17, wherein the instructions cause the at least one processor to calculate the adjustment of at least two of the rollers of the plurality of rollers.

20. The computer readable medium as defined in claim 17, wherein the instructions cause the at least one processor to calculate a flare of the material based on at least one of the first or second data.

21. The computer readable medium as defined in claim 17, wherein the instructions cause the at least one processor to generate a point cloud representation of the material.

22. The computer readable medium as defined in claim 21, wherein the instructions cause the at least one processor to calculate the adjustment of the at least one of the plurality of rollers based on the point cloud representation.

* * * * *